US011757721B2

(12) United States Patent
Jung et al.

(10) Patent No.: US 11,757,721 B2
(45) Date of Patent: Sep. 12, 2023

(54) APPLICATION TOPOLOGY VISUALIZATION

(71) Applicant: VMware, Inc., Palo Alto, CA (US)

(72) Inventors: Daniel Jung, Danville, CA (US); Sanket Bindle, Mountain View, CA (US); Anuj Jaiswal, Saratoga, CA (US); Soo Hyun Park, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/154,612

(22) Filed: Jan. 21, 2021

(65) Prior Publication Data

US 2021/0328877 A1 Oct. 21, 2021

Related U.S. Application Data

(60) Provisional application No. 63/010,742, filed on Apr. 16, 2020.

(51) Int. Cl.
*H04L 41/12* (2022.01)
*H04L 41/0604* (2022.01)
*H04L 41/0631* (2022.01)
*H04L 41/22* (2022.01)

(52) U.S. Cl.
CPC ............ *H04L 41/12* (2013.01); *H04L 41/065* (2013.01); *H04L 41/0627* (2013.01); *H04L 41/22* (2013.01)

(58) Field of Classification Search
CPC ... H04L 41/0627; H04L 41/065; H04L 41/12; H04L 41/22
See application file for complete search history.

(56) References Cited

U.S. PATENT DOCUMENTS

| | | | | |
|---|---|---|---|---|
| 2009/0327903 | A1* | 12/2009 | Smith | H04L 41/22 715/737 |
| 2011/0277034 | A1* | 11/2011 | Hanson | G06F 21/554 709/224 |
| 2012/0036484 | A1* | 2/2012 | Zhang | H04L 41/12 715/853 |
| 2014/0304033 | A1* | 10/2014 | Cardno | G06F 16/2246 705/7.29 |
| 2020/0162344 | A1* | 5/2020 | Zapponi | H04L 41/12 |

* cited by examiner

*Primary Examiner* — Glenton B Burgess
*Assistant Examiner* — Patrick F Ngankam

(57) ABSTRACT

A computer-implemented system and method of application topology visualization of a computing environment is disclosed. The application topology visualization obtains relationship data for a plurality of managed components, wherein the plurality of managed components have an application operating thereon. Event data for the plurality of managed components is also obtained. An application topology visualizer is used to generate the application topology visualization of the computing environment including the plurality of managed components, wherein the application topology visualization uses the relationship data and the event data for the plurality of managed components. A graphical user interface is used to display the application topology visualization of the computing environment as a single page.

20 Claims, 18 Drawing Sheets

APPLICATION TOPOLOGY VISUALIZATION

RELATED APPLICATION

This application claims priority to the provisional patent application having Application No. 63/010,742, entitled "APPLICATION TOPOLOGY VISUALIZATION," with filing date Apr. 16, 2020, by Jung et al., which is herein incorporated by reference in its entirety.

BACKGROUND

Virtual-machine technology essentially abstracts the hardware resources and interfaces of a computer system on behalf of one or multiple virtual machines, each including one or more application programs and an operating system. Cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Managing and troubleshooting customer data centers which include virtual servers as well as physical servers, virtual machines and virtual applications is often quite difficult. Moreover, any downtime associated with problems in the data center, or components thereof, can have significant impact on a customer relying on the data center.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
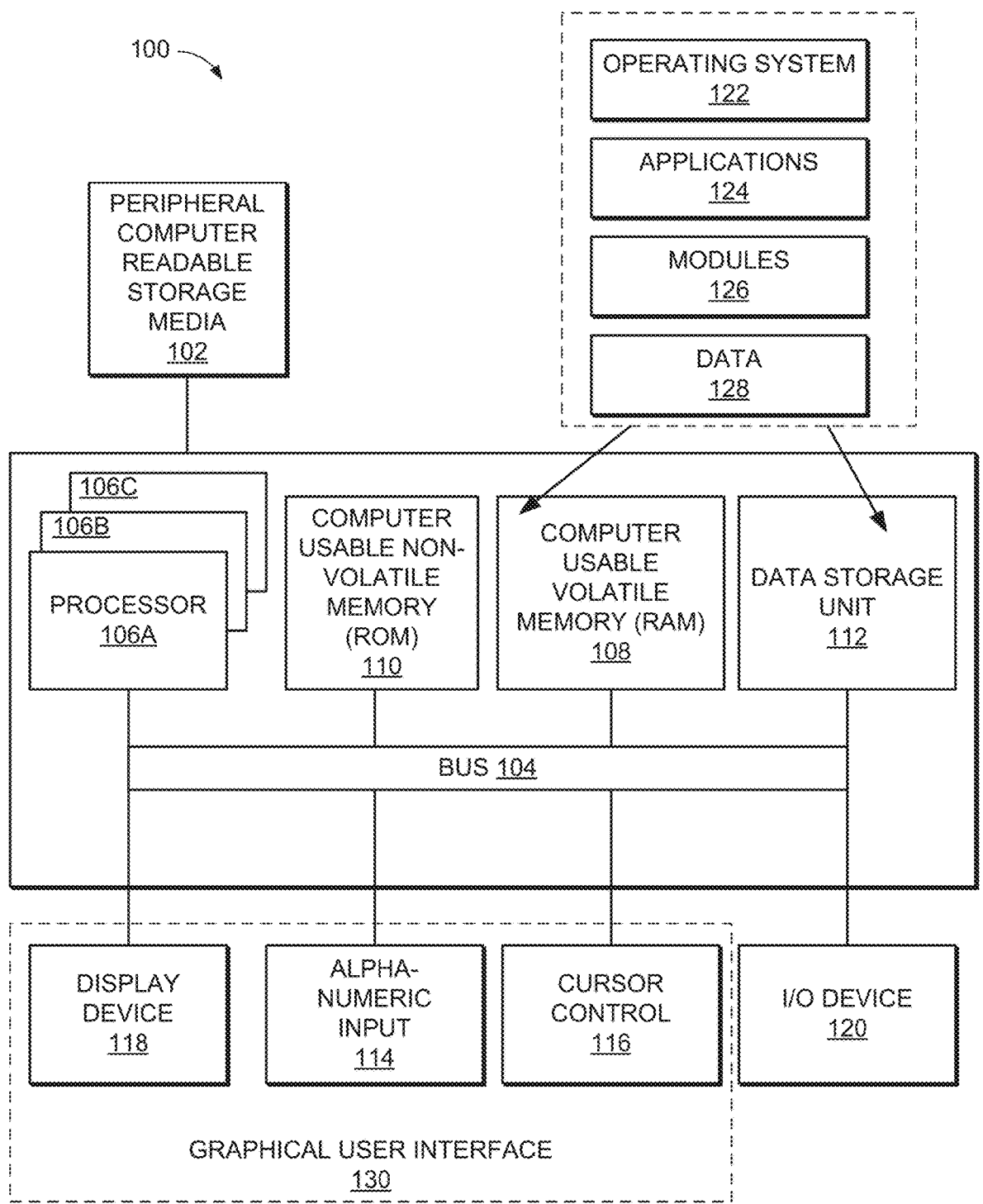
FIG. 1 illustrates an example computer system upon which the present invention can be implemented, in accordance with an embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included in the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits in a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "capturing," "filtering," "receiving," "applying," "requesting," "aggregating," "communicating," "maintaining," "transforming," "generating," "accessing," "performing," "identifying," "effectuating," "correlating," "utilizing," "determining," "updating," "displaying," or the like, refer to the actions and processes of an electronic computing device or system such as: a host processor, a processor, a memory, a software defined network (SDN) manager, a system manager, a hyper-converged appliance, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities in the electronic device's registers and memories into other data similarly represented as physical quantities in the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described herein. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided in dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

In the following discussion, applications are defined as a group of virtual machines and IP addresses running interdependent services to serve a specific business function in a datacenter.

In the following discussion, developers create applications and deploy them over the virtual/physical servers and the access to the applications is provided to the end users either within or outside the datacenter using a network such as, for example, the Internet.

Overview of Discussion

Discussion begins with a description of an example computer system environment, upon which embodiments of the present invention may be implemented. An example cloud-based computing environment, upon which embodiments of the present invention may be implemented, is then discussed. A software-defined data center (SDDC) is a hyper-converged infrastructure (HCI) solution based on defined hardware configurations pre-integrated with a software-defined data center (SDDC) software. The EVO SDDC solution enables customers to deploy a fully self-contained Infrastructure-as-a-Service (IaaS) and/or Virtual Desktop Infrastructure (VDI) private cloud based on a complete SDDC architecture.

In general, an application is deployed over the virtual/physical servers as a logical grouping and an application typically has one or more tiers which are like functional sub-groups. As such, it is difficult for anyone to see what machines are grouped together in the virtual/physical environment upon which the application is running. Moreover, if there is a problem in a specific server it impacts multiple inter-dependent services and could slow down the entire application. However, because of the logical grouping of the virtual/physical machines hosting the application, it can be difficult and time intensive to identify the underlying cause of the problem.

In a prior solution, a user would install a probe (e.g., a piece of software) on a first virtual machine (VM). The probe would have visibility into what is happening in the first VM. The information from the probe would include any applications operating on the first VM and identify other virtual and/or physical machines or components with which the first VM is communicating. The user would then go to another VM (e.g., a second VM) identified as being in communication with the first VM. The user would install a probe on the second VM which would provide visibility into what is happening in the second VM. Similar as above, the information would include any applications operating on the second VM and identify other virtual and/or physical machines or components with which the second VM is communicating. The user could then continue this process until every VM has been probed and all the connections are identified. As can be seen, this is a labor-intensive process that would require significant man hours.

Moreover, in some cases, if the virtual environment is large enough, this job can require one or more managers assigned just to the virtual environment. Moreover, the same probing would need to be performed anytime a component was added, removed, or modified. Thus, it would not be a one-time probing, but it would need to be performed as part of an ongoing process to maintain the performance of the network of virtual/physical servers, one or more tiers of the network, which are like functional sub-groups, and the like.

Embodiments described herein provide a computer-implemented system and method for providing a user with access to an application topological visualization via a graphical user interface (GUI).

In one embodiment, the unique solution of the present technology provides a representation of all the information of the application in a single diagram. In one embodiment, hexagons are used to represent tiers. In one embodiment, the information regarding physical switches in context of the application or selected tiers allows the user to see both physical and virtual infrastructure together in the same diagram. In so doing, the application topology visual diagram allows a manager (or user or the like) to review the network structure defined by the application topology visual diagram and use the diagram to troubleshoot the application whenever something occurs (e.g., a network data slowdown, an error, data loss, performance degradation, or the like.)

In one embodiment, the application topology visualization will allow a user to see the landscape of components of the application (e.g., allocation and the like) and how each of the components are dependent on each other.

In one embodiment, if there is an issue or problem in the system, there can be an alert icon (e.g., a pop-up, badge, or the like) that would show up in the application topology visual diagram. In one embodiment, when the user goes to the tier that has the badge, the badge will identify the number of problems, and the user can then select the tier to drill down into the next level of the application topology visual diagram. In one embodiment, the user can continue to follow the alert icon and continue to drill down until the user reaches the level of the application topology visual diagram that shows the actual component or issue that is causing the alert.

In one embodiment, when the user goes to the tier that has the badge, the badge will identify the number of problems, and the user can then select the badge which will take the user directly to the level of the application topology visual diagram that shows the actual component or issue that is causing the alert.

Thus, the application topology visualization solution provides a new and different way to present a topology that allows a user to "see" the application topology. For example, in one embodiment, the components of the application include aspects like tiers, communication with Internet, physical infrastructure, flow information, any problems on any of the components, additional information for each of the components present, whether all the flows of a given tier are protected or not, communication between tiers, and the like.

In one embodiment, tiers can be web, db, app, or the like, where each tier could contain one or more of VMs, IP addresses, Kubernetes pods, or the like. In one embodiment, physical infrastructure: can include aspects such as top of the rack switches that are the first hope for the VMs/Ips. In one embodiment, flows information represents the communication information, e.g., what is talking to what. In one embodiment, communication of tiers includes communication with shared services, other applications, or the like.

In one embodiment, the application topology visual diagram can be manipulated based on time. For example, the user could select a time (e.g., a week ago) and the application topology visual diagram would present the status of the network as it was a week ago. In one embodiment, the user could use the time manipulation to determine changes to the network by reviewing the differences in the "last week" application topology visual diagram and the now or real-time application topology visual diagram.

The present technology uses a standalone collector methodology (or the like) that collects and transmits product usage data back to an application topology visualizer (e.g., the VMware Analytics Cloud (VAC) infrastructure). The collector not only captures telemetry data, it also listens for changes and events which are streamed back to the application topology visualizer in near-real time. Data collected includes configuration, feature and performance data. In one embodiment, the collector also captures and product/component internal data in the form of task events that indicate internal operations of the product/component. The application topology visualizer uses this data to proactively review the customer environment, perform research analyses for Service Requests (SRs), and provide prescriptive recommendations to improve overall environmental health and performance.

Embodiments described herein provide a proactive computing environment support technology including components such as, for example, a computing environment data collector, an application topology visualizer, and an application topology visualizer analytics component. The described embodiments provide a standalone data collector that collects and transmits product usage data back to an application topology visualizer. The data collector not only captures telemetry data, it also listens for changes and events which are streamed back to application topology visualizer in real-time or near-real time. Data collected includes configuration, feature and performance data.

In one embodiment, the data collector is a standalone data aggregator that collects and transmits event data and relationship data for components of the computing environment to an application topology visualizer. In one embodiment, the application topology visualizer is remote (e.g., off-site).

One example of an application topology visualizer is the VMware Analytics Cloud (VAC) infrastructure. In some embodiments, the application topology visualizer analytics are improved by comparing the analytics across multiple computing environments. In such a way, the application topology visualizer can utilize analytics for one computing environment for providing application topology visualizer analytics for another computing environment. It should be appreciated that such functionality can be performed without exposing the data or knowledge across the computing environments, by securely controlling the data for the separate computing environments.

The application topology visualizer provides a single page view of the computing environment, allowing a user to easily grasp the scope and complexity of the components (e.g., data centers) of the computing environment. In some embodiments, the application topology visualizer is web-based. The application topology visualizer provides an investigation and scoping solution, that also provides the ability to drill down into specific configurations, tasks and events. The application topology visualizer provides a complete view of the computing environment in a non-product specific way including the intertwined relationships across the components of the computing environment as one holistic solution.

In one embodiment, the application topology visualizer analytics component provides analytics about the present state of the computing environment. In some embodiments, the application topology visualizer analytics component is integrated into the application topology visualization In some embodiments, the application topology visualizer analytics component provides reports, such as an operation summary report and/or a health assessment report. In one embodiment, the operational summary report is an ongoing wellness summary of the computing environment that can be generated periodically, or is generated in real time. In one embodiment, the health assessment report is a checkup summary that includes recommendations to promote improvements in overall environment health and performance, configuration review, prescriptive recommendations on design compliance, best practices recommendations, etc.

For example, management of a virtual network can include monitoring and awareness of the health, capacity, performance, and environment. Example virtual network health information includes, data health, infrastructure health, network health, and input/output operations per second (IOPS). Example capacity information includes data efficiency, data distribution, and usage predictions. Example performance information includes IOPS, throughput, latency and latency hotspots. Example environment information includes VM overview, host overview, version usage, enabled features, and the like.

As will be described in detail, the various embodiments of the present invention do not merely implement conventional processes on a computer. Instead, the various embodiments of the present invention, in part, provide a previously unknown procedure for providing a single page application topology visualization that at its top level provides a complete overview of the application topology. Moreover, the user can drill down to a next tier of the application topology visualization by selecting one or more items on the display and the next tier will be presented on a single page of a display. This type of drilling down can be performed until the finest detail is displayed.

Thus, in one embodiment, the application topology visualizer will allow a computer to provide a user with a clear single page picture-based topology, rather than requiring the user to know how to write graph traversal algorithms. Hence, embodiments of the present invention provide a novel process for management of a customer data center which is necessarily rooted in computer technology and which streamlines the management, monitoring, and troubleshooting presentation by the computing system to significantly reduce computer operations, presentation output, and overall computer management system performance specifically arising in the realm of data centers and distributed systems.

The described embodiments provide an application topology visualizer that uses automation to collect configuration, feature, and performance data through data driven analytics. This can radically transform visibility into a computing environment for manager, client, and user. It also provides a single page representation of what component are running, which components are communicating, how the components are performing, and the like. By being able to observe the application topology visualization, a better knowing and understanding of what is occurring operationally within a computing environment in real-time will be obtained.

Embodiments disclosed herein improve the capabilities of support organization to support our customers who use products both on the premise and in the cloud through the use of data driven analytics. By improving visibility into not only what our customers buy, but how they deploy and use the solutions day to day, customer-facing teams will be more successful through driving informed interactions across all our customer touch points. Thus, the technology described herein will reduce time-to-resolution for service requests and contribute to enhance customer relationship-building due to a more informed interaction with the customer's environment.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or in a number of different computer systems including, but not limited to, general purpose networked computer systems, embedded computer systems, routers, switches, server devices, client devices, various intermediate devices/tiers, standalone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 1066, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a UI 130 under the direction of a processor (e.g., processor 106A or processors 106A, 106B, and 106C). UI 130 allows user to interact with system 100 through application topology visualization representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations in RAM 108, computer-readable storage media in data storage unit 112, peripheral computer-readable storage media 102, and/or other tangible computer-readable storage media.

Figure 2:
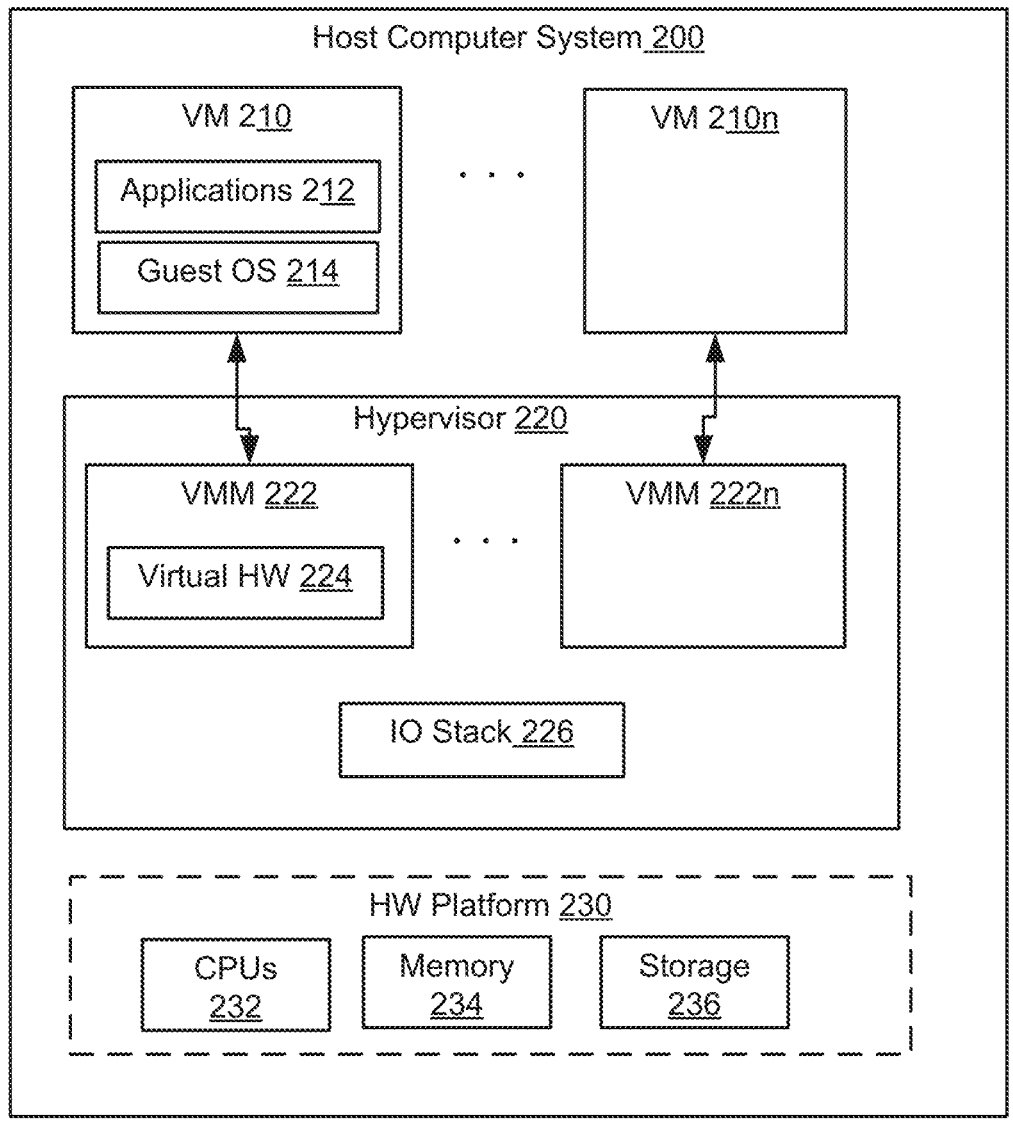
FIG. 2 depicts a block diagram of a host computing system, in accordance with an embodiment.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. Example operating systems include, without limitation, Windows operating systems (e.g., Windows 7, Windows 8, Windows 10, or Windows Server 2012 R2), UNIX operating systems (e.g., Mac OS X server), and Linux operating systems. Moreover, it should be appreciated that operating systems are updated over time to different versions of the operating system (e.g., to provide improved functionality and/or to address security concerns). In accordance with various embodiments, operating system versions can refer to a particular release of an operating system and/or a particular build of an operating system. For example, a security patch applied to an operating system may refer to a new version of the operating system.

IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

In various embodiments, a management interface component, such as a software defined network (SDN) manager (e.g., VMware's NSX manager), provides control for virtual networking services. The management control interface provides configuration management for components (e.g., hosts, virtual servers, VMs, data end tiers, etc.) of the virtualized environment. To effectuate management of the virtual network, management interface components are configured to manage and/or utilize logical objects (e.g., managed logical objects and non-managed logical objects). Logical objects with a virtualized environment (e.g., a virtualization infrastructure) may make reference to or be referenced by other logical objects In various embodiments, a virtual network, using at least one hypervisor 220, reproduces the Layer 2 through Layer 7 networking services (e.g., switching, routing, access control, firewalling, quality of service (QoS), and load balancing) as logical objects. Accordingly, these networking services can be programmatically assembled (e.g., by a networking administrator) in any combination, to produce individual virtual networks. Virtual networks are independent of underlying network hardware (e.g., hardware platform 230), allowing for network hardware to be treated as a networking resource pool that can be allocated and repurposed as needed.

Example Computing Environment

Figure 3A:
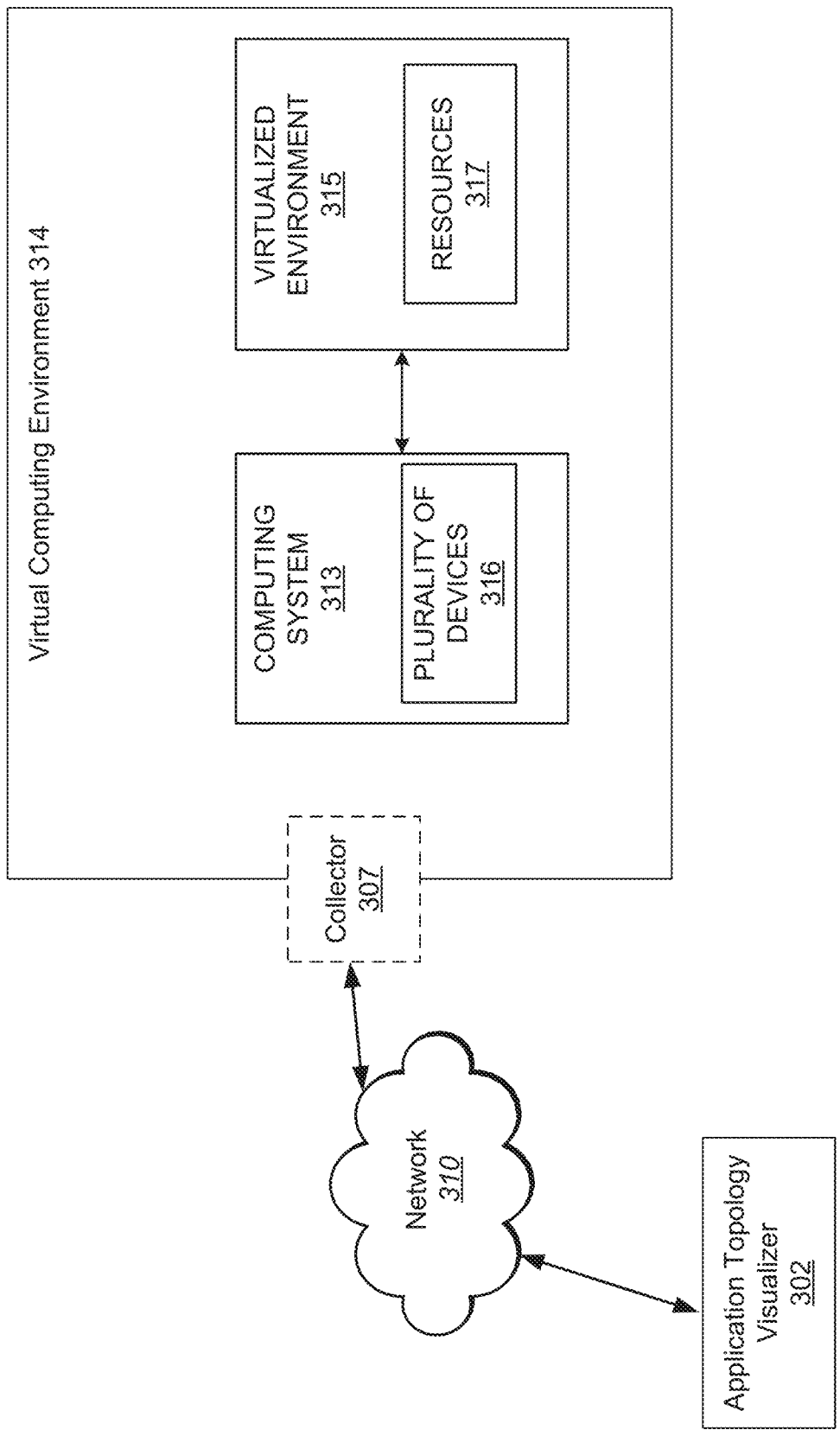
FIG. 3A illustrates an example cloud-based computing environment communicatively coupled with application topology visualizer, in accordance with an embodiment.

FIG. 3A illustrates an example virtual computing environment communicatively coupled with an application topology visualizer, in accordance with various embodiments. In the cloud-computing paradigm, computing cycles and data-storage facilities are provided to organizations and individuals by cloud-computing providers. In addition, larger organizations may elect to establish private cloud-computing facilities in addition to, or instead of subscribing to computing services provided by public cloud-computing service providers. In one embodiment, application topology visualizer 302 accesses the virtual computing environment (VCE 314), through a connection such as, but not limited to, the network 310. In one embodiment, a system administrator for the organization, using application topology visualizer 302, will accesses the virtual computing environment (VCE 314), through a secure connection such as, but not limited to, the network 310.

For example, collector 307 can provide configuration information about VCE 314 to application topology visualizer 302. In one embodiment, collector 307 is a standalone aggregator that collects & transmits product usage data back to the application topology visualizer 302. The collector 307 not only captures product usage data, it also listens for changes and events which are streamed back to application topology visualizer 302 in real-time or near-real time. In one embodiment, application topology visualizer 302 is part of a VMware Analytics Cloud (VAC).

In one embodiment, VCE 314 (or virtualization infrastructure) includes computing system 313 and virtualized environment 315, according to various embodiments. In general, computing system 313 and virtualized environment 315 are communicatively coupled over a network such that computing system 313 may access functionality of virtualized environment 315.

In one embodiment, computing system 313 may be a system (e.g., enterprise system) or network that includes a combination of computer hardware and software. The corporation or enterprise utilizes the combination of hardware and software to organize and run its operations. To do this, computing system 313 uses resources 317 because computing system 313 typically does not have dedicated resources that can be given to the virtualized environment 315. For example, an enterprise system (of the computing system 313) may provide various computing resources for various needs such as, but not limited to information technology (IT), security, email, etc.

In various embodiments, computing system 313 includes a plurality of devices 316. The devices are any number of physical and/or virtual machines. For example, in one embodiment, computing system 313 is a corporate computing environment that includes tens of thousands of physical and/or virtual machines. It is understood that a virtual machine is implemented in virtualized environment 315 that includes one or some combination of physical computing machines. Virtualized environment 315 provides resources 317, such as storage, memory, servers, CPUs, network switches, etc., that are the underlying hardware infrastructure for VCE 314.

The physical and/or virtual machines of the computing system 313 may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware apt). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The VCE 314 may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 313 may be a cloud environment, built upon a virtualized environment 315. Computing system 313 may be located in an Internet connected datacenter or a private cloud computing center coupled with one or more public and/or private networks. Computing system 313, in one embodiment, typically couples with a virtual or physical entity in a computing environment through a network connection which may be a public network connection, private network connection, or some combination thereof. For example, a user may connect, via an Internet connection, with computing system 313 by accessing a web page or application presented by computing system 313 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware Exit hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a virtual system are provided with respect to FIG. 3B.

During use, the virtual machines perform various workloads. For example, the virtual machines perform the workloads based on executing various applications. The virtual machines can perform various workloads separately and/or in combination with one another.

Example VMware EVO SDDC Rack

Figure 3B:
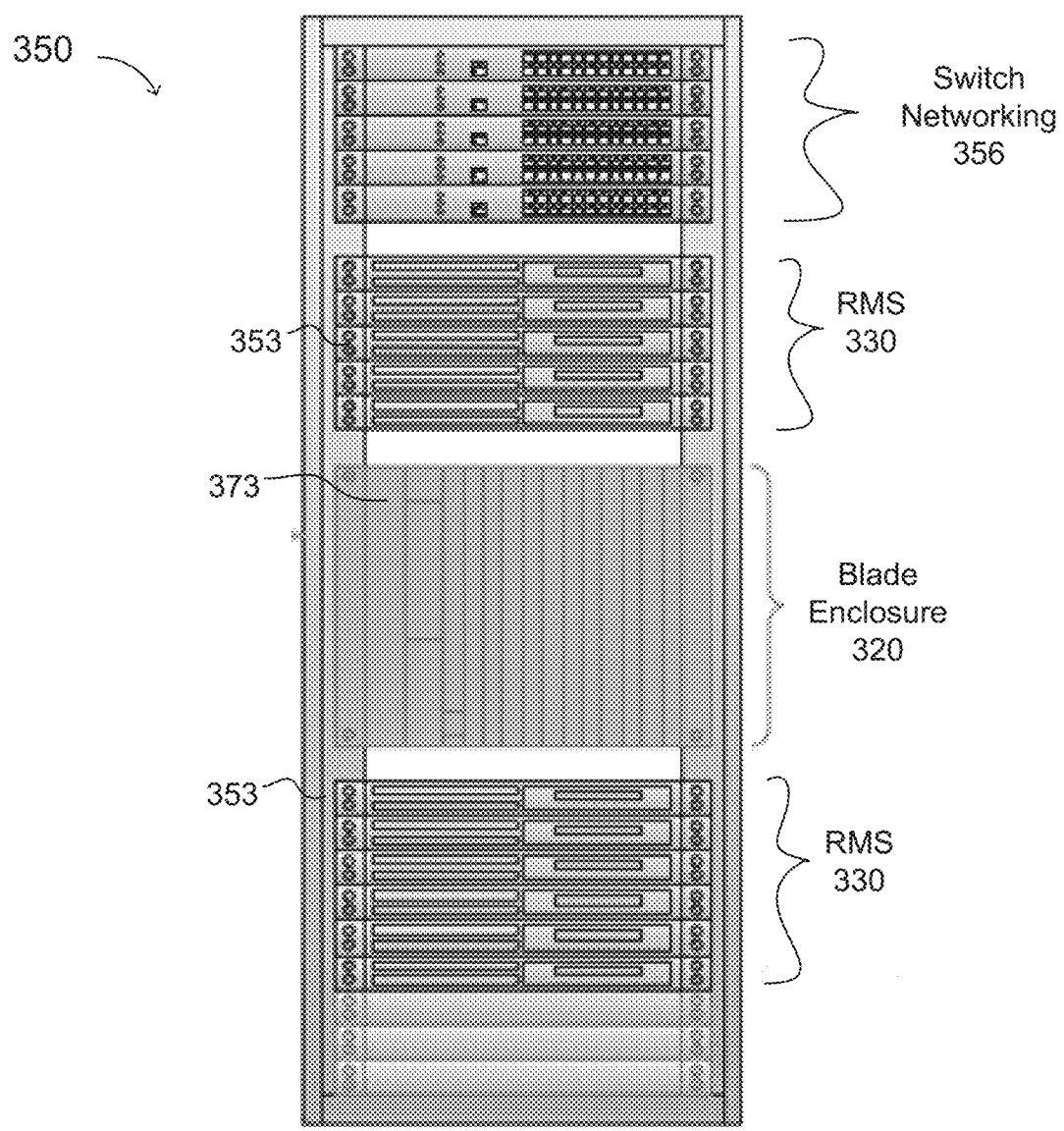
FIG. 3B, illustrates a block diagram of a VMware EVO SDDC rack, in accordance with an embodiment.

With reference now to FIG. 3B, a block diagram of a VMware EVO SDDC rack 350 (hereinafter SDDC rack 350) is shown in accordance with an embodiment. In one embodiment, SDDC rack 350 is a combination of software and hardware that are stored on a rack. However, the technology is also suited to one or more components of SDDC rack 350 being stored in locations other than the rack. Moreover, although there are some specific organizations of SDDC rack 350 discussed herein and contained in the figures, the technology may be well suited to different arrangements, organization, or the like. In general, SDDC rack 350 utilizes the concepts of virtualization across all data center resources and services (compute, storage, and networking) to deliver a fully automated, zero-downtime infrastructure that can transparently include different hardware over time. SDDC rack 350 provides abstraction, pooling, and automation of the compute/storage/networking infrastructure services. Under SDDC rack 350, policy-driven automation will enable provisioning and ongoing management of both physical and logical compute, storage, and network services. In FIG. 3B, SDDC rack 350 includes switch networking 356, blade enclosure 320, and rack server or rackmount servers (RMS) 330.

Switching network 356 may also include management capabilities that are part of a dedicated management infrastructure running in each physical rack. The management capabilities include aspects such as inventory management, security management, performance management, and availability management.

Inventory management refers to aspects such as a virtual resource manager (VRM), and the like. VRM is a hardware abstraction layer that interfaces with the hardware components such as servers with direct attached storage (DAS), switches, power distribution units (PDUs), and other physical devices. It is responsible for discovery, inventory, monitoring, configuration, and lifecycle management of individual servers or switches. For example, the VRM will automatically discover new devices and processes hardware events (e.g., alarms, sensor data threshold triggers) and state changes. VRM then exposes events and state changes to the rest of the SDDC rack 350 in a hardware-independent manner. VRM also supports rack-level boot-up sequencing of hardware components and provides services such as secure, remote, hard reset of these components.

In general, VRM manages the physical components of the physical rack, e.g., blade(s) 373 in blade enclosure 320, servers in RMS 330, and the like; and maintains a corresponding software physical rack object. In other words, VRM monitors the hardware health of the switches and hosts and reports each one's health status. Thus, the VMware EVO SDDC system calculates the hardware health state of the resource based on the current set of alerts that the VRM has raised for that hardware resource and the severities of those alerts, including any alerts on the hardware Field Replaceable Units (FRUs) contained within that resource.

In one embodiment, security management manages remoted disks and access to one or more resources in rack 350. Security management may manage access using secure industry authentication schemes.

In one embodiment, performance management matches application performance needs with available infrastructure. Availability management matches application availability requirements for the given application.

Switch networking 356 includes one or more different switch and network devices that allow rack 350 to communicate with different racks, different switches, switches from different manufacturers, racks with different operating systems, and the like. A switch in switch networking 356 may be any of a number of switch types, such as, for example, a management switch, a top of rack (TOR) switch, spine switch, or the like.

Blade enclosure 320 is an enclosure to host one or more blade server(s) 373. Similarly, RMS 330 refers to one or more rack server(s) 353 stored in rack 350. In general, server 353 may be any of a plurality of server types. One example of a server's characteristics may be an Intel x86 based server that contains redundant, multi-gigabit network interfaces, power supplies, as well as a combination of hard drives and solid state drives. Although in FIG. 3B, a specific number of servers, blades, and switches are shown, it should be appreciated that one embodiment of a full rack may include 24 tiers which may be include a number of servers, a number of blades, a number of switches, a number of other components, and the like. Thus, the use of arrangement provided in the diagram and used in the discussion is merely for purposes of clarity.

In one embodiment, one or more of inventory management, performance management, and availability management, can either act as the collector 307, or provide information to collector 307. For example, in one embodiment, the VRM could be the collector 307 for the application topology visualizer. In one embodiment, collector 307 is an on-premises appliance that collects a set of data from customer data centers across the entire product footprint and then streams to application topology visualizer 302 in real-time or near real-time. For example, the collected sets of data are then streamed over the network 310 to the application topology visualizer 302. In one embodiment, it is a continuous stream of data from the products within the VCE 314.

For products that sit inside secure data center networks with no access to the network 310. The collector 307 sits in an intermediate area where it is on a network that is trusted to talk into the data center network. But it can also, as an individual network endpoint on the network, be allowed access to talk to the application topology visualizer 302 endpoint to send the data back to the application topology visualizer 302.

Example Collector

Figure 4:
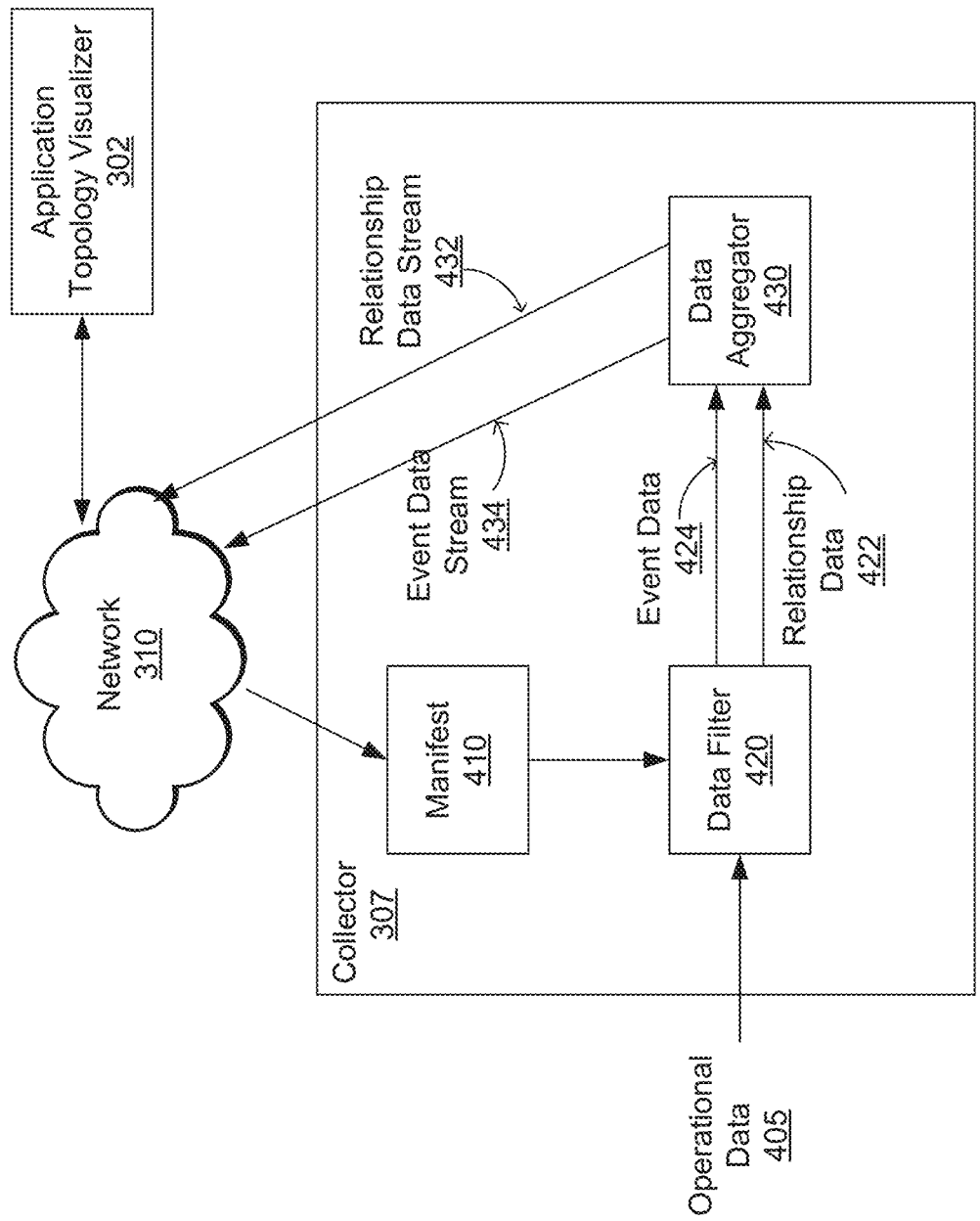
FIG. 4 illustrates a block diagram of a collector, in accordance with an embodiment.

FIG. 4 illustrates a block diagram of a collector 307, in accordance with various embodiments. Collector 307 includes manifest 410, data filter 420, and data aggregator 430. In some embodiments, collector 307 is a virtual appliance that is a fully packaged version of the collector and its user interface. Collector 307 is installed within a computing environment (e.g., VCE 314). In one embodiment, collector 307 is installed as a virtual machine with read-only privileges to one of more management interface components (e.g. VMware vCenters and/or NSX managers/controllers).

In some embodiments, the collector 307 is a Java application that runs within a PhotonOS Virtual Appliance (VA). Collector 307 acts as a gateway from a computing environment to funnel configuration and event information to an application topology visualizer for analysis and support case resolution. The collector 307 can be dynamically updated (e.g., through its call-home mechanism) through a global manifest maintained at application topology visualizer 302. Manifest 410 is a locally stored version of the global manifest, and controls the filtering of collected operational data 405 by collector 307.

In some embodiments, a collector 307 is registered with application topology visualizer 302 before it can send data to be processed. An identifier in the application topology visualizer 302 KV is created on order to share data with application topology visualizer 302. The level of service provided to the computing environment is further managed by the level of service maintained by the computing environment. The level of service indicates what reporting and analysis offerings are given back to the customer responsible for the computing environment.

Collector 307 is configured to communicate with application topology visualizer 302 to provide a data push for communicating event data 424 and relationship data 422. Collector 307 is also configured to retrieve data from application topology visualizer 302 (e.g., from a public key/value store) for retrieving data that is globally accessible to all collectors in all managed computing environment (e.g., manifest 410), collector/customer specific information, or command sequences (e.g., to shutdown the collector, initiate updates, or post informational messages. In some embodiments, collector 307 has a web server that provides a customer facing on-premise UI for configuration and management.

In one embodiment, upon startup, during period checks, or the like, collector 307 pulls down a global manifest from the application topology visualizer 302 KV store under a shared configuration file. The collector 307 can be configured (via command line file edits) to use this file, request a custom manifest, or only use a locally stored manifest. It should be appreciated that there can multiple manifests (versioned) with different identifiers on the application topology visualizer 302 side. The manifest can be ordered in the way their version changed. The manifest poller starts downloading manifest in this order and tries to read them in its current format. In some embodiments, the first downloaded manifest that can be parsed in the current collector format is stored as manifest 410.

Collector 307 is configured to capture operational data 405 within a computing environment (e.g., VCE 314), wherein the computing environment includes a plurality of managed components, where the managed components are interrelated. In some embodiments, at least a portion of the managed components are sourced from the same provider (e.g., manufacturer). In embodiments where the managed components are commonly sourced, the provider of the managed components may have additional insights into the interrelated activities and interconnectivity of the components, allowing for enhanced analytics. In one embodiment, the application topology visualizer 302 is maintained by an application topology visualizer. In one embodiment, the application topology visualizer 302 is within the firewall of the computing environment.

In some embodiments, the computing environment is a datacenter and the plurality of managed components includes hardware components and virtual components of the datacenter. In some embodiments, collector 307 is a virtual appliance residing within the computing environment. In some embodiments, collector 307 is communicably coupled components of the computing environment via a management interface component of the plurality of managed components.

Collector 307 uses the operational data 405 within the computing environment to identify event data 424 and relationship data 422. As used herein, operational data refers to any data communicated over the computing environment. In one embodiment, the event data 424 is data generated as a function of the regular component operations. An event is a data object type that contains information about state changes of managed components of a computing environment. Events include user actions and system actions that occur on datacenters, datastores, clusters, hosts, resource pools, virtual machines, networks, and distributed virtual switches. Examples of events include, without limitation: Powering a virtual machine on or off, creating a new virtual machine, installing applications on a guest OS of a virtual machine, configuring or reconfiguring a component, or adding a component (hardware or software) to the computing environment. Event data 424 includes information describing the event and temporal information (e.g., a time stamp) related to the event.

The relationship data 422 is data generated by a component indicating the related components (e.g., parent/child components) of the component. The components can be represented as objects, and collector 307 receives parent/child relationship information for objects. In some embodiments, the relationship information 422 is every time there is a change to the topology of the computing environment. For example, if a component is added, removed, or moved within a computing environment, relationship data 422 is generated. Another example of relationship data 422 is a component failure (e.g., hard drive failure). It should be appreciated that relationship data 422 may be generated coincident to an instance of event data 424. Relationship data 422 includes information describing the relationship between components and temporal information (e.g., a time stamp) related to the event.

In one embodiment, collector 307 communicates the event data 424 and relationship data 422 to application topology visualizer 302. In one embodiment, data aggregator 430 aggregates the event data 424 and relationship data 422 and transmits the event data 424 and relationship data 422 to application topology visualizer 302 in real-time or near real-time. In some embodiments, collector 307 communicates the event data 424 and relationship data 422 to application topology visualizer 302 as it is received (e.g., in real-time). In some embodiments, collector 307 communicates the event data 424 and relationship data 422 to application topology visualizer 302 at some interval (e.g., periodically or upon receiving an amount of the event data 424 and relationship data 422). In some embodiments, event data 424 and relationship data 422 are communicated to application topology visualizer 302 over separate data streams (e.g., event data stream 434 and relationship data stream 432.

Application topology visualizer 302 is configured to generate an application topology visualization of the computing environment. The relationship data 422 is received, where component relationship data includes parent/child information for a managed component of the plurality of managed components at a moment in time. The relationship data 422 is transformed into application topology visualization that is provided as a single page for the computing environment, wherein the application topology visualization is maintained at application topology visualizer 302.

Figure 5:
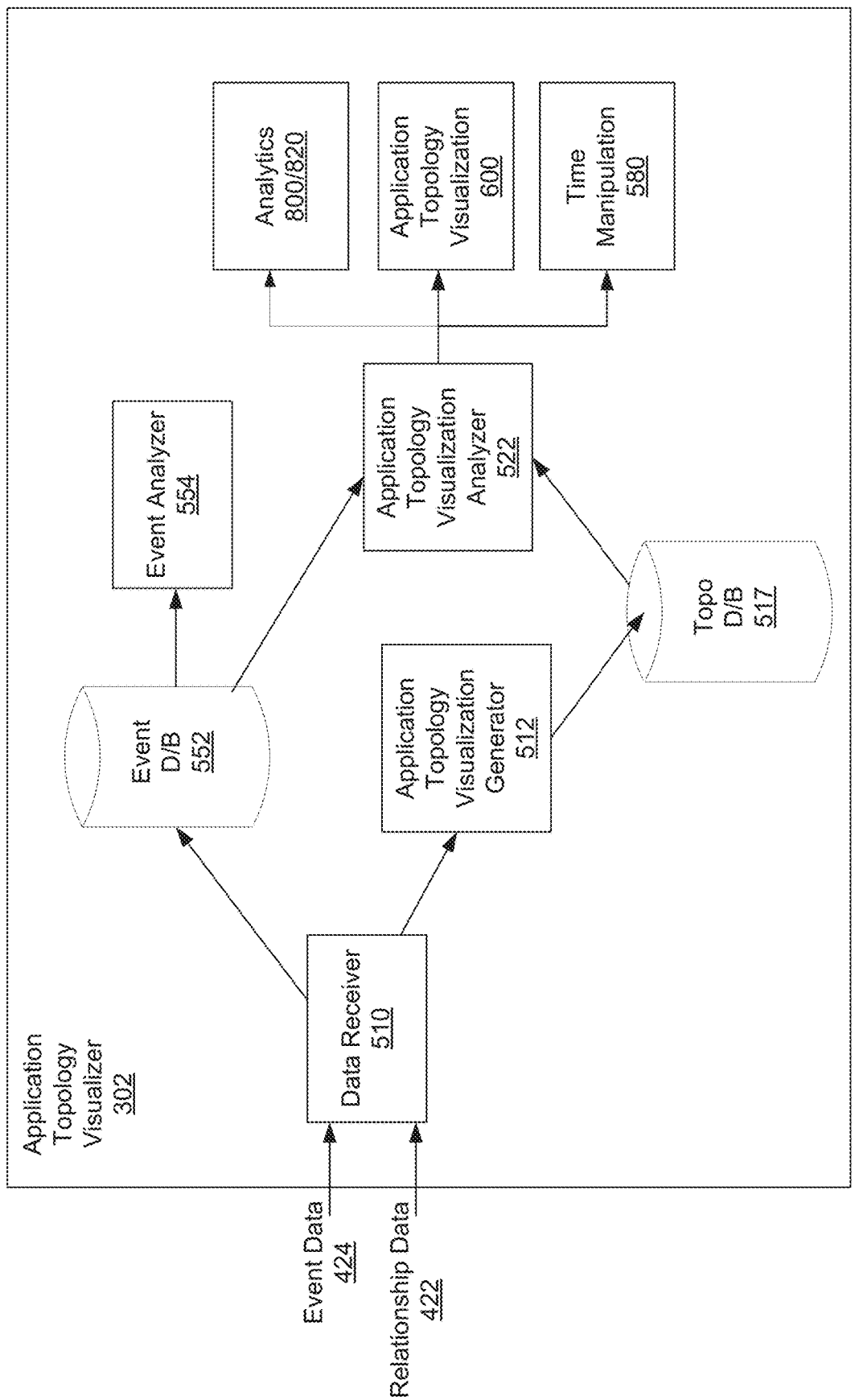
FIG. 5 illustrates a block diagram of an application topology visualizer, in accordance with an embodiment.

FIG. 5 illustrates a block diagram of an application topology visualizer 302, in accordance with various embodiments. In one embodiment, the application topology visualizer 320 provides a view of the current state of the computing environment that will provide a grasp the scope and complexity of the components (e.g., data centers) of the computing environment. In one embodiment, the application topology visualizer 320 provides a present operation status, investigation and scoping solutions, and the ability to scroll back in time and observe how the computing environment has changed.

With reference now to FIG. 5, in one embodiment, event data 424 and relationship data 422 is received at data receiver 510 of the application topology visualizer 302 from collector 307 for parsing the received data and directing event data 424 to event database 552 and directing relationship data 422 and event data 424 to application topology visualization generator 512. In one embodiment, the application topology visualization 522 is generated based on relationship data 422 while event data 424 is used for enhanced visualization of the impact of events on application topology changes and analytics.

In one embodiment, event analyzer 554 receives event data 424 from event database 552, and performs analysis using the event data 424. Relationship data 422 gets written by a script at application topology visualization generator 512 to a topo database 517.

For example, at time zero, (the first time it is turned on in the computing environment) a complete application topology is built of what the data center environment looks like. In one embodiment, the components of the application include aspects like tiers, communication with Internet, physical infrastructure, flow information, any problems on any of the components, additional information for each of the components present, whether all the flows of a given tier are protected or not, communication between tiers, and the like.

In one embodiment, the tiers (e.g., tiers 0-5) in the application topology visualization 600 can be web, db, app, or the like, where each tier could contain one or more of VMs, IP addresses, Kubernetes pods. In one embodiment, physical infrastructure: can include aspects such as top of the rack switches that are the first hope for the VMs/Ips. In one embodiment, flows information represents the communication information, e.g., what is talking to what. In one embodiment, communication of tiers includes communication with shared services, other applications, or the like. The full application topology visualization is stored in the database 517.

As part of the completion of the application topology visualization ingest, another job is initiated, e.g., application topology visualization analyzer 522 runs a scripting language that analyzes application topology visualizations and codifies the assessment of the application topology visualization to formulate questions about the customers environment; e.g., is it deployed correctly, are things configured properly, are there any known issues that can be detected with a script. In one embodiment, application topology visualization analyzer 522 also accesses event data 424 from event database 552 for enhanced analysis and visualization of the impact of events on application topology changes and analytics 800. In one embodiment, the assessment results in application topology visualization 600.

In one embodiment, the full update can be done by default over a set period (e.g., every 12 hours, every day, etc.) The full update provides all information again. Every time the full update is performed, it is reconciled what the current state of the application topology visualization. The reconciliation identifies any drift between the configuration state the application topology visualization represents and the reality of the customer environment.

At another time, e.g., time 1 (1 second, 2 minute, 1 hour later, etc.) driven by when the data center does something and the changes are subscribed to; e.g., someone deploys a virtual machine, changes a configuration setting, etc. Whenever the event occurs, the information is packaged up and sent to the application topology visualizer 302. Then a task gets the data and updates the application topology visualization, e.g., the application topology visualization looked like X now they build a new application topology visualization that looks like Y that represents the now state of the application topology visualization, e.g., application topology visualization 600, and the prior application topology visualization that looked like X is stored in the topo database 517.

Time Manipulation

As the changes stream in (e.g., as relationship data 422), the application topology visualization 600 can be navigated through time. For example, the application topology visualization can show what the data center looked like at time zero or at time n, or anywhere in between (e.g., time manipulation 580). The application topology visualization can show how the application topology visualization changed over time, such that a user can step incrementally through the application topology visualization and see what new tiers came into the application topology visualization, what relationships came in, what relationships were deleted, etc.

The facts about any object within the application topology visualization can be analyzed to see what changed about the entity within the application topology visualization and how it changed over the period of time.

For example, a user could select a time (e.g., a week ago) and the application topology visualization 600 would present the status of the network as it was a week ago. In one embodiment, the user could use the time manipulation to determine changes to the network by reviewing the differences in the "last week" application topology visualization 600 and the now or real-time application topology visualization 600.

In one embodiment, for example, a manager goes on a vacation for a week. When the manager returns, they could use the time manipulation to bring up the "last week" application topology visualization 600 and then compare it with the real-time application topology visualization 600. This comparison could be done by the application topology visualization 600 highlighting changes (or providing change icons, or the like) that would allow the user to see what components and/or configuration changes have occurred while they were away. As such, the manager would be able to update themselves on what had occurred to the network while they were away.

In another embodiment, if there are problems that occurring in the network, the manager could use the time manipulation to revert the application topology visualization 600 to a time before the problem occurred and then play the application topology visualization 600 forward to see when the problem began to appear. In so doing, the application topology visualization 600 would provide another troubleshooting tool that would be available to the manager. That is, the manager would be able to see what started the problem.

For example, if the problem began Saturday at midnight, by Monday morning, the application topology visualization 600 may include quite a few alert indicators. The indicators could be providing a number of pieces of information such as packet loss, application failures, etc. By moving the time line of the application topology visualization 600 back to Saturday at 11:59, (e.g., a point just prior to the occurrence of the initial problem), the manager would be able to identify the initial alert occurring on the application topology visualization 600.

The manager could select the alert and identify a routing configuration change (e.g., a route misconfiguration) that caused a buffer of a communication port to fill up and then start dropping packages (for example). In one embodiment, the manager could continue to watch (at an increased rate of speed, or by jumping ahead a certain period of time (e.g., 30 minutes, etc.)) the application topology visualization 600 as it changes over the rest of the missed time period. In so doing, the manager could determine that it was the routing misconfiguration causing the communication port failure that was the root issue and that the rest of the problems were caused or in-part a development of the initial communication port failure.

In one embodiment, the manager would also be able to interact with the application topology visualization 600 at the earlier time period, to drill down and identify the routing misconfiguration that caused the failed communication port in the application topology visualization 600.

For example, if the failure occurred Saturday at midnight, the application or the network it is operating on, could have identified the communication port buffer failure and implemented a work around. In so doing, by Monday the problem would be resolved. Without the application topology visualization 600, including the micro segmentation disclosed herein, the manager would come in on Monday morning see that the application and network are running smoothly and not even know about or identify the communication port work around.

However, by using the application topology visualization 600 and the different managerial aspects such as micro segmentation and the like, the manager would be alerted to the initial problem that occurred Saturday at Midnight. In one embodiment, the alert would provide a time stamp with the problem. In so doing, the manager would be able to use the application topology visualization 600, drill down to the identified port in error, identify the routing configuration change that caused the route miscommunication, and resolve the erroneous routing configuration thereby bringing the communication port back online and moving the application and its underlying network components back into proper working configuration.

In other words, the manager would be able to use the application topology visualization 600 to identify that the network is using a workaround and then resolve the initial issue to remove the need for the work around even though the application was operating without error (as visible to the application user) on Monday morning when the manager returned to work. Thus, in addition to identifying problems that are presently occurring in the system, the application topology visualization 600 would also be able to provide insight as to work arounds that are occurring, components that are in need of replacement or are working at a less than desired or required state or level, and the like. Thus, the application topology visualization 600 will provide real time views of the system, preventative information about components such as, for example, components that are operating at a less than optimal capacity and that are in need of replacement before failure, components that are approaching their capacity (such as a memory storage, that will be filled soon, thereby requiring the addition of another or additional memory storage to the network), a component that has failed and is being bypassed, a component that is being used less than anticipated (such as a memory storage allocation that is only being used at about a quarter of its capacity and as such could allow some amount of the memory storage allocation to be removed from the network), etc.

Thus, one embodiment provides analytics 800/820 of a computing environment using the application topology visualizer 302. The computing environment is analyzed to determine whether the computing environment has, for example, deviated from known best practice configurations, compliance status for areas such as hardware compatibility and software interoperability. In addition, known problems or issues that have publicly accessible resolutions via a service provider knowledge base will be detected and information presented to administrators of the computing environment, e.g., through a Web Client plugin interface. Some embodiments utilize a common collector framework (CCF) in order to identify state changes in customer environments that relate to known problems, issues or failures. In addition to failure detection, deviation from identified best practices will also be reported. These items are known as "Alerts".

Figure 6:
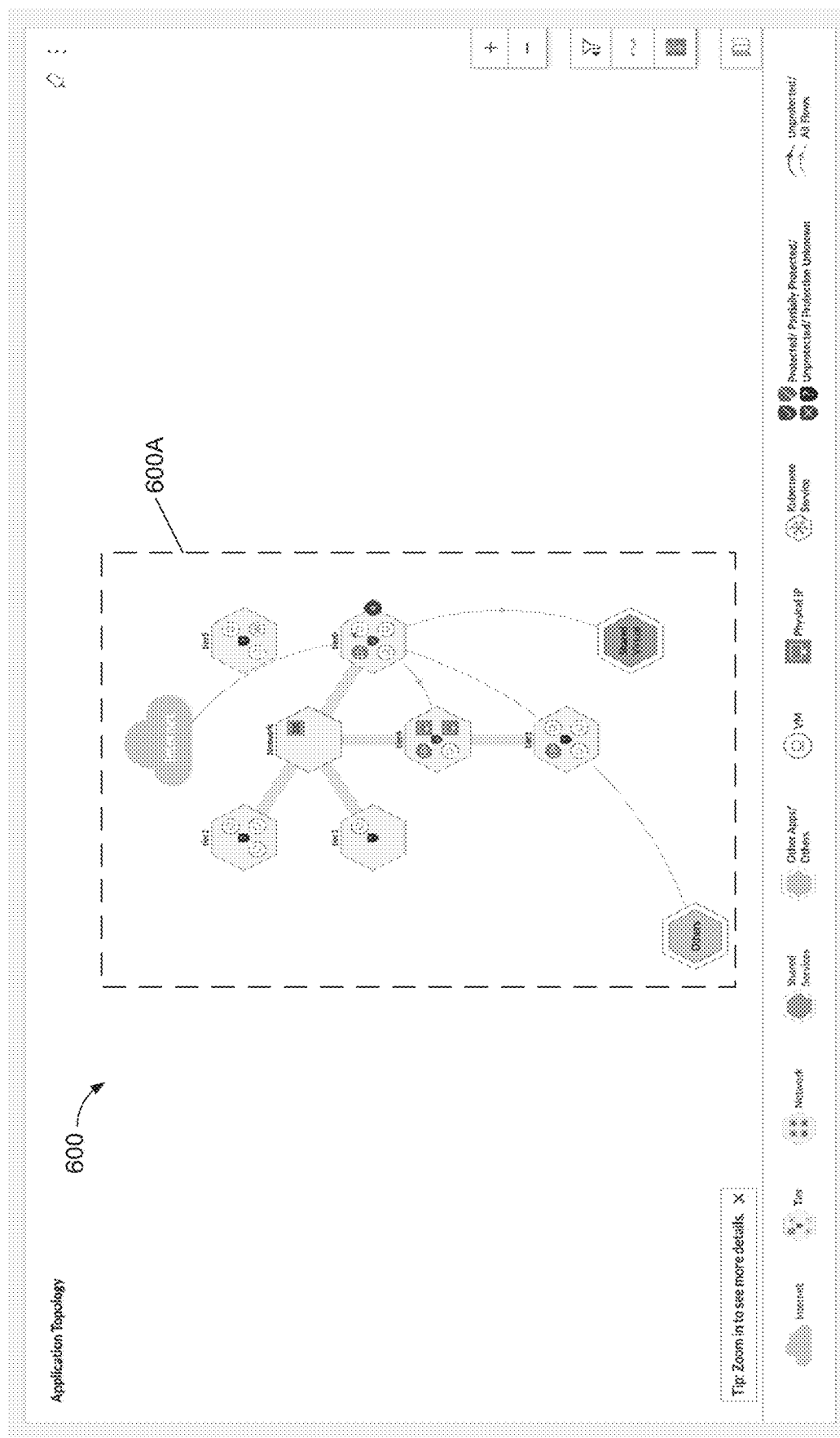
FIG. 6 is a screen shot of an example of the application topology visualization of the customer data center, in accordance with an embodiment.

FIG. 6 is a screen shot of an example of the application topology visualization 600 of the customer data center, in accordance with an embodiment. In one embodiment, application topology visualization 600 is presented on a GUI via a web-based portal that internal support organization teams will access to view the current state of a customer's computing environment. In one embodiment, as shown in further detail in FIGS. 10-12C, the application topology visualization 600 provides a single page representation that provides the ability for drilling down into specific configurations, tasks and events. In one embodiment, application topology visualization 600 includes a network, network access (e.g., Internet), a number of tiers (e.g., tiers 0-5), shared virtual services, and other applications.

In one embodiment, application topology visualization 600 includes a key to identify the different icons, such as Internet, tier, network, shared services, other apps/others, VM, physical IP, Kubernete service, protected/partially protected/unprotected/protection unknown, flows including protected and unprotected flows, and the like.

Figure 7:
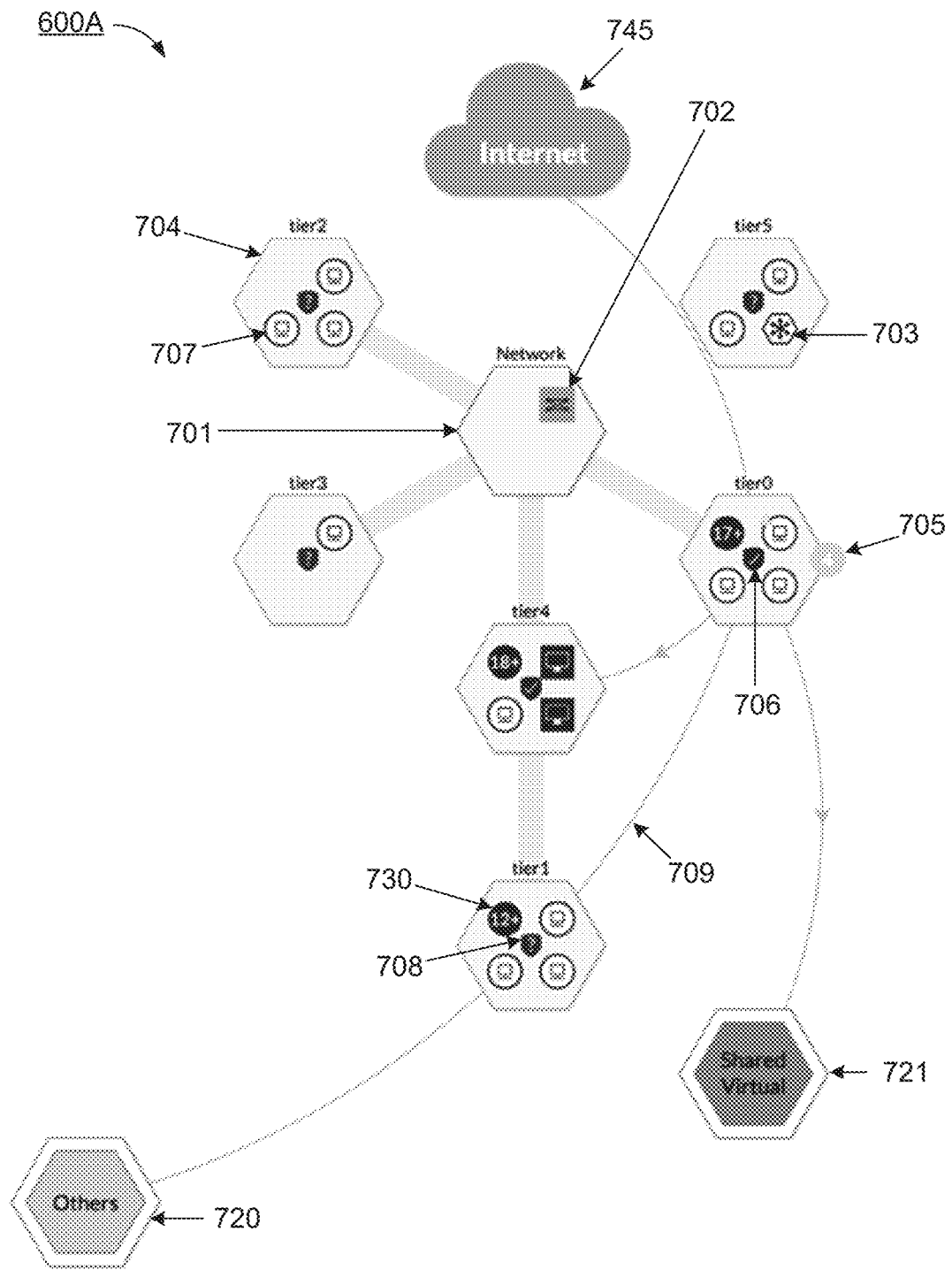
FIG. 7 is a view of only the application topology visualization without the key information that is provided on the GUI presenting application topology visualization of FIG. 6, in accordance with an embodiment.

FIG. 7 is a view 600A of only the application topology visualization 600 without the key information that is provided on the GUI presenting application topology visualization 600 of FIG. 6. In one embodiment, application topology visualization 600 includes a number of hexagons (such as hexagon 704) that represent the different tiers (e.g., tiers 0-5). In one embodiment, application topology visualization 600 also includes network group 701, and Internet 745.

For purposes of clarity, one or more of the identified components are shown in one or more different tiers. However, this is provided for purposes of clarity in the diagram. As is apparent, one or more of the tiers could contain some or all of the different components.

In one embodiment, application topology visualization 600 (and one or more of the tiers therein include a top of the rack switch (TOR) 702, Kubernetes service 703, an identifier 705 of the aggregate number of problems for components of a tier, protection status (e.g., protected 706, unknown 708, etc.), flow 709 (which is shown as representing the flow between tier 0 and tier 1 but is clear that there are a number of different flows in the application topology visualization 600), shared services 721, other applications 720 that tiers are talking to, VMs/Ips identifier 730 indicating the number of VMs/Ips on the specific tier, and the like. Although a number of features are shown, it should be appreciated that in one embodiment, more or less features may be included in each tier structure.

Figure 8:
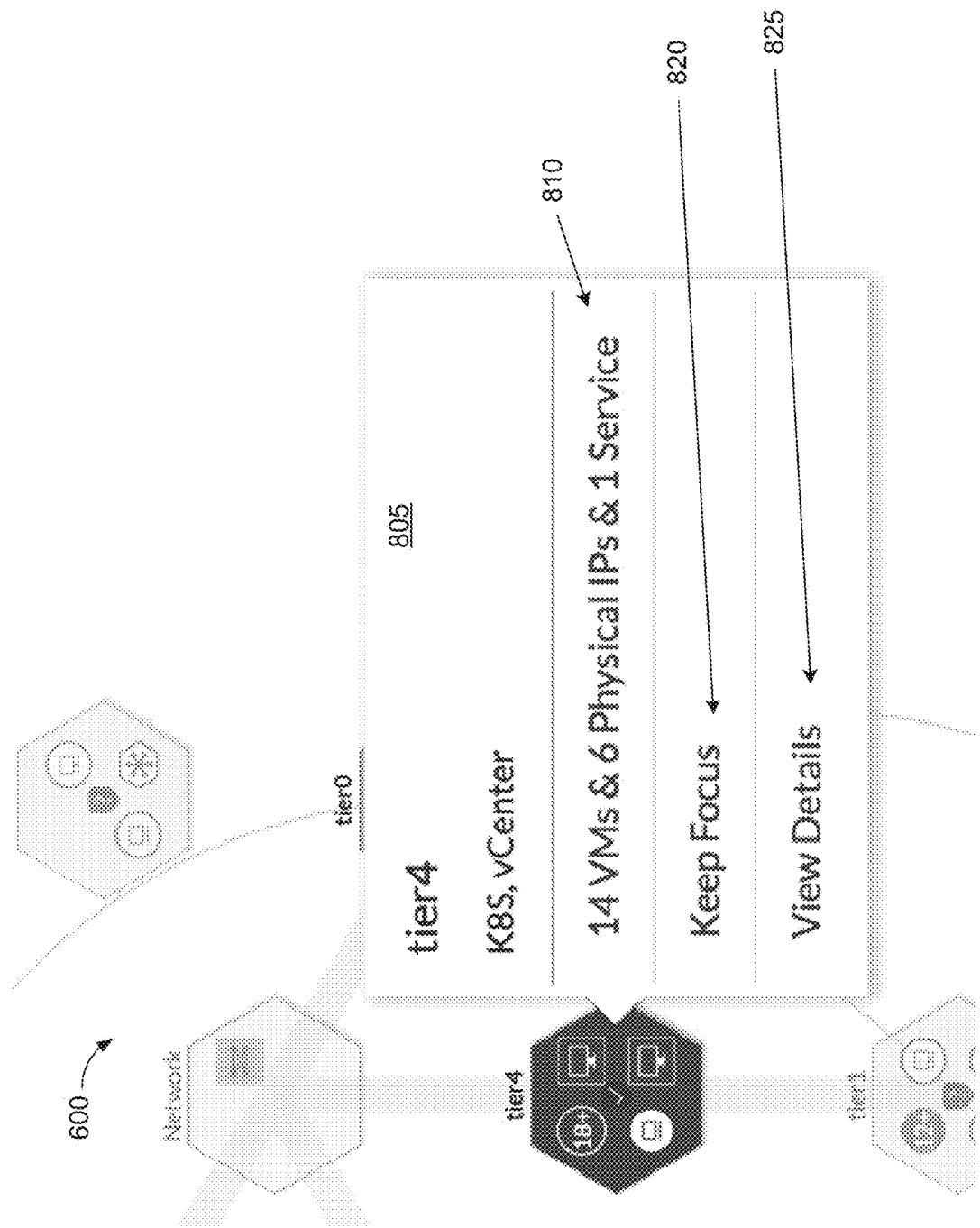
FIG. 8 illustrates a screen shot of a GUI view of a contextual menu of a tier of application topology visualization, in accordance with an embodiment.

FIG. 8 illustrates a screen shot of a GUI view of a contextual menu of a tier of application topology visualization 600, in accordance with an embodiment. In one embodiment, by hovering (or the like) over a tier hexagon (e.g., tier 4), the application topology visualization 600 will show a contextual menu 805 that will include additional information. For example, at FIG. 8, the contextual menu 805 has a title "tier4" and an address/descriptor KBS, vCenter. In one embodiment, the contextual menu 805 will include membership 810 which is an identification of the members within the tier. For example, membership 810 discloses 14 VMs, 6 physical IPs, and 1 service. In one embodiment, contextual menu 805 includes keep focus 805 which, when selected, will keep the tier in focus and always show any other tiers with which it is communicating even after the mouse (or finger, pointer, input device, or the like) is no longer hovering over the tier. In one embodiment, instead of hovering, a click, tap, or other input at the tier can be used to cause contextual menu 805 to open.

In one embodiment, there is also an option to view additional details 825 about the tier. In general, additional details 825 could include other tiers that the tier is communicating with, menu items, alerts, errors, analysis information, and the like.

Figure 9:
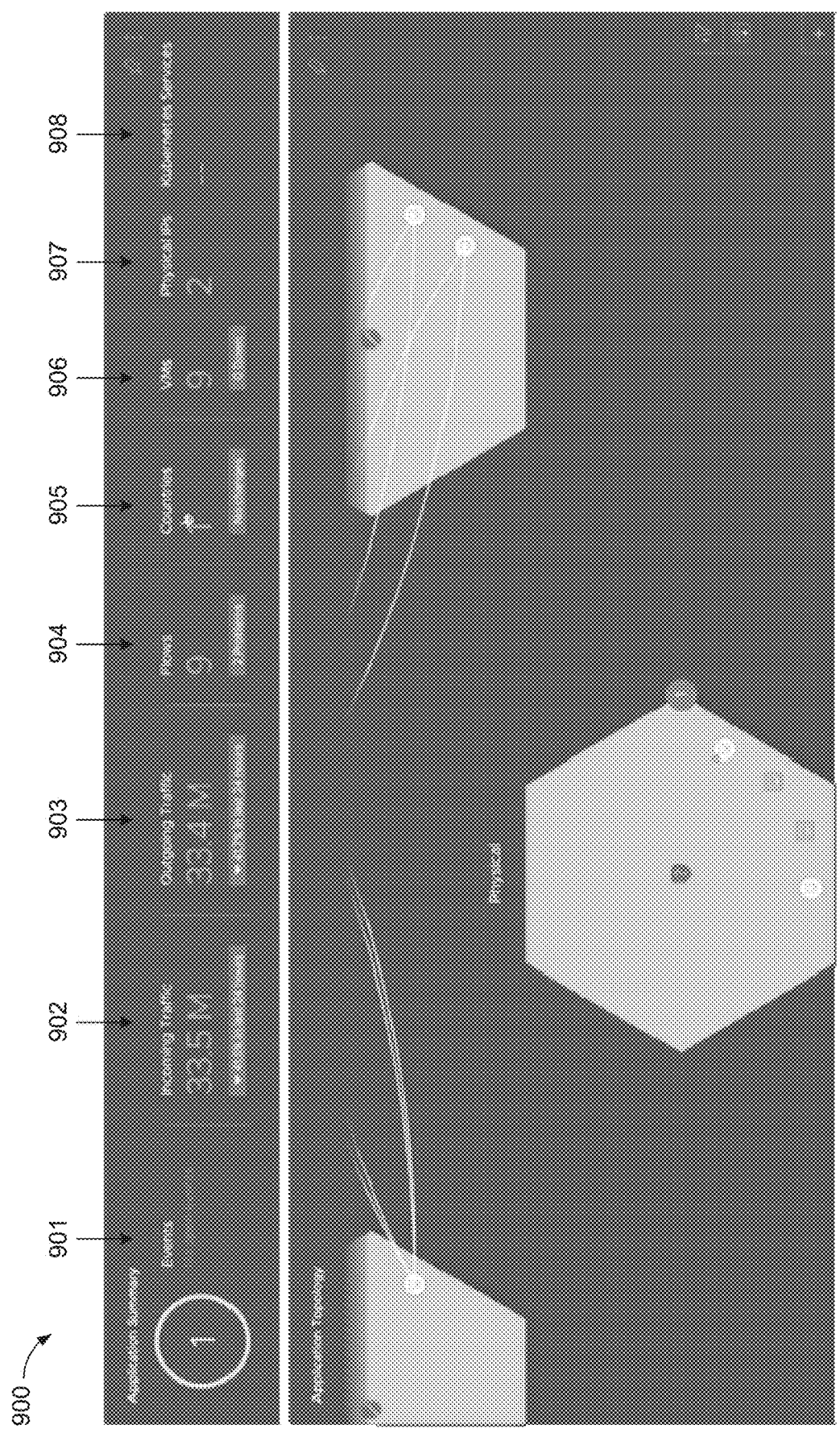
FIG. 9 is a screen shot of a GUI display showing a representation of an application summary report for a given tier, in accordance with an embodiment.

FIG. 9 is a screen shot of a GUI display showing a representation of an application summary 900 report for a given tier in accordance with an embodiment. In one embodiment, reports are generated from the data used to generate and maintain application topology visualization 600. One report is application summary 900 report and another report is a micro-segments 920 report. It should be appreciated that the reports may be one screen of a UI for presenting analytics information that includes a high-level view of the operation of the computing environment. In one embodiment, the reports include one or a plurality of frames for presenting the information.

In one embodiment, application summary 900 includes information such as events 901, an amount of incoming traffic data 902 (over a given time period), an amount of outgoing traffic data 903 (over a given time period), a number of flows 904 (which in one embodiment includes an identifier indicating a number of problems), a number of countries 905, a number of VMs 906, a number of physical Ips 907, any Kubernetes services 908, and the like.

In one embodiment, the application summary 900 could be for all of the user selected tiers, for the entire application topology visualization 600, or the like.

Figure 10:
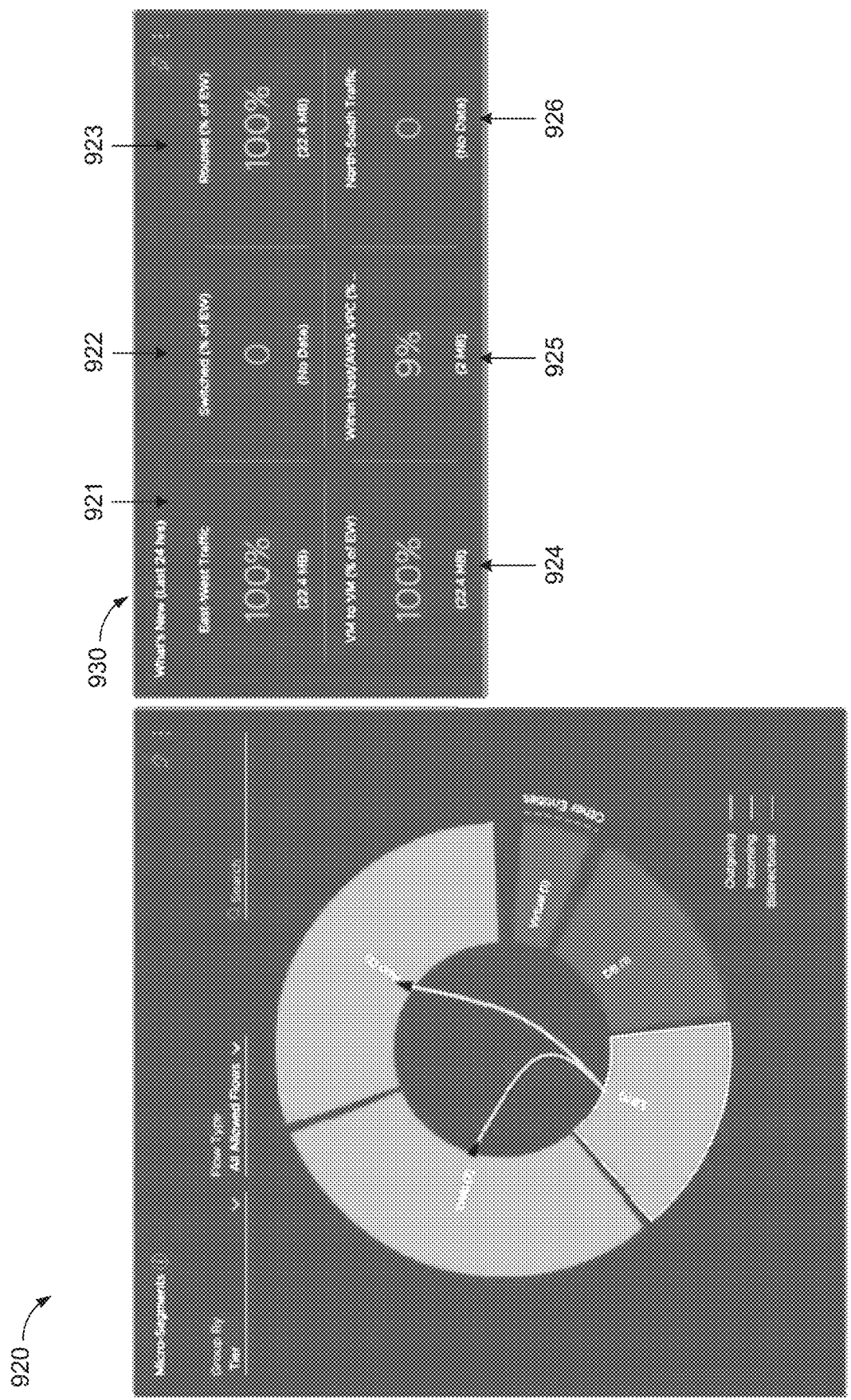
FIG. 10 is a screen shot of a GUI display showing a representation of a micro-segments report for a given tier, in accordance with an embodiment.

FIG. 10 is a screen shot of a GUI display showing a representation of a micro-segments 920 report for a given tier in accordance with an embodiment. In one embodiment, micro-segments 920 includes flow information such as which tiers are talking to which tiers. In one embodiment, there are incoming arrows, outgoing arrows, and bidirectional arrows to represent the different flows. In one embodiment, micro-segments 920 report also includes an updates menu 930 that shows what's new and can be set for different time periods. For example, in FIG. 10, the time period is the last 24 hours. However, it should be appreciated that the time period could be adjusted such as past 2 hours (e.g., over lunch), past 48 hours (e.g., over a weekend), past 2-weeks (e.g., over a vacation) or the like. Thus, the use of 24 hours is one embodiment and is provided for purposes of clarity.

In one embodiment, the updates menu 930 includes information such as, but not limited to, East-West traffic 921, switched 922, routed 923, VM to VM communication percentage 924, within host/AWS VPC 925, North-South traffic 926, and the like.

Figure 11A:
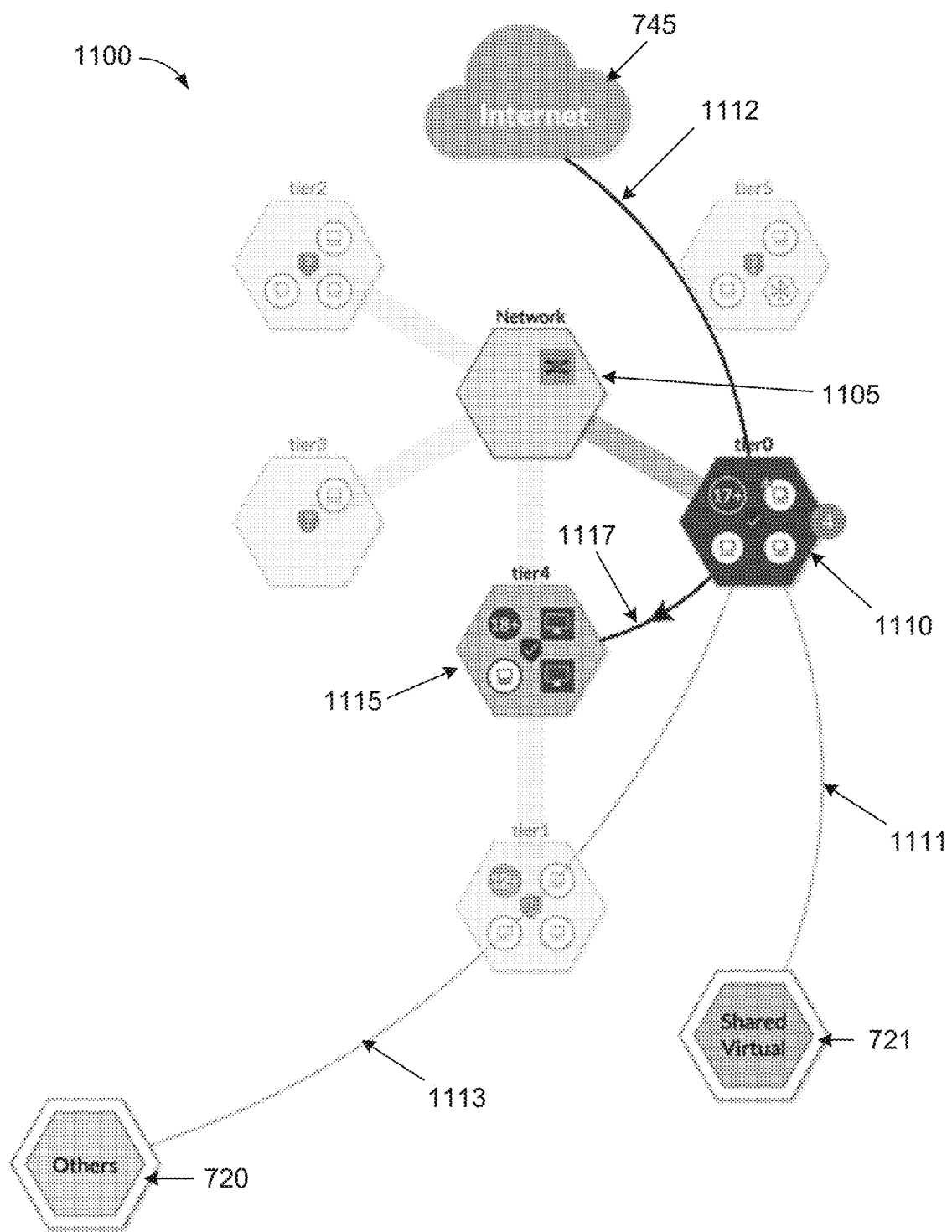
FIG. 11A is a flow diagram of a selection state of a tier, in accordance with an embodiment.

FIG. 11A is a flow diagram 1100 of a selection state of a tier in accordance with an embodiment. In one embodiment, the selected tier 1110 is tier0. In one embodiment, when the hexagonal tier0 is the selected tier 1110 it will be visually identifiable. In flow diagram 1100, the different tier(s) 1115 that are communicating with the selected tier 1110 are also visually identifiable by a darker shade than the remaining tiers. In one embodiment, for example, the selected tier 110 is tier0 and it is communicating with the different tier 1115 (e.g., tier4).

In one embodiment, the flow 1111 to shared virtual services 721 and flow 1113 to other applications 720 is identified but not highlighted. However, the flow 1117 to tier4 and flow 1112 to the Internet 745 are visually distinguishable from other flows in the application topology visualization 600. In one embodiment, the flow 1112 to Internet 745 represents at least one member of the selected tier 1110 is talking to the Internet 745. In one embodiment, physical infrastructure 1105 of the tier is identifying the network tier.

Figure 11B:
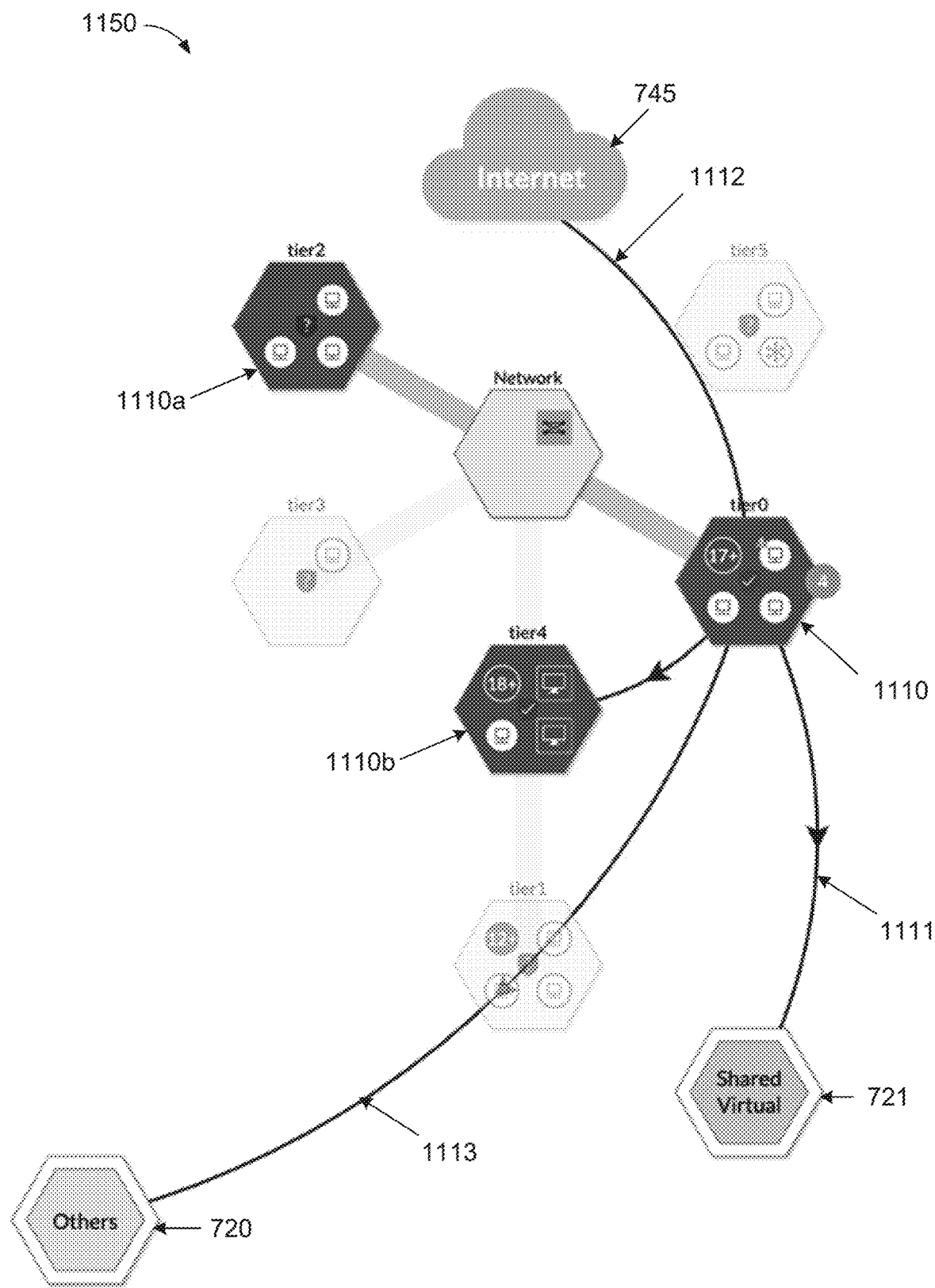
FIG. 11B is a flow diagram of a selection state for a number of tiers, in accordance with an embodiment.

FIG. 11B is a flow diagram 1150 of a selection state for a number of tiers in accordance with an embodiment. In one embodiment, the selected tiers 1110, 1110a, and 1110b are respectively tier0, tier2, and tier4. In one embodiment, when the hexagonal tier0, tier2, and tier4 are the selected tiers 1110-1110b will be visually identifiable by a darker shade than the remaining tiers.

In one embodiment, the flow 1111 to shared virtual services 721 and flow 1113 to other applications 720 are highlighted along with the flows to tier4 and flow 1112 to the Internet 745. In other words, the flows being used by the selected tiers are visually distinguishable from other flows in the application topology visualization 600.

Figure 12A:
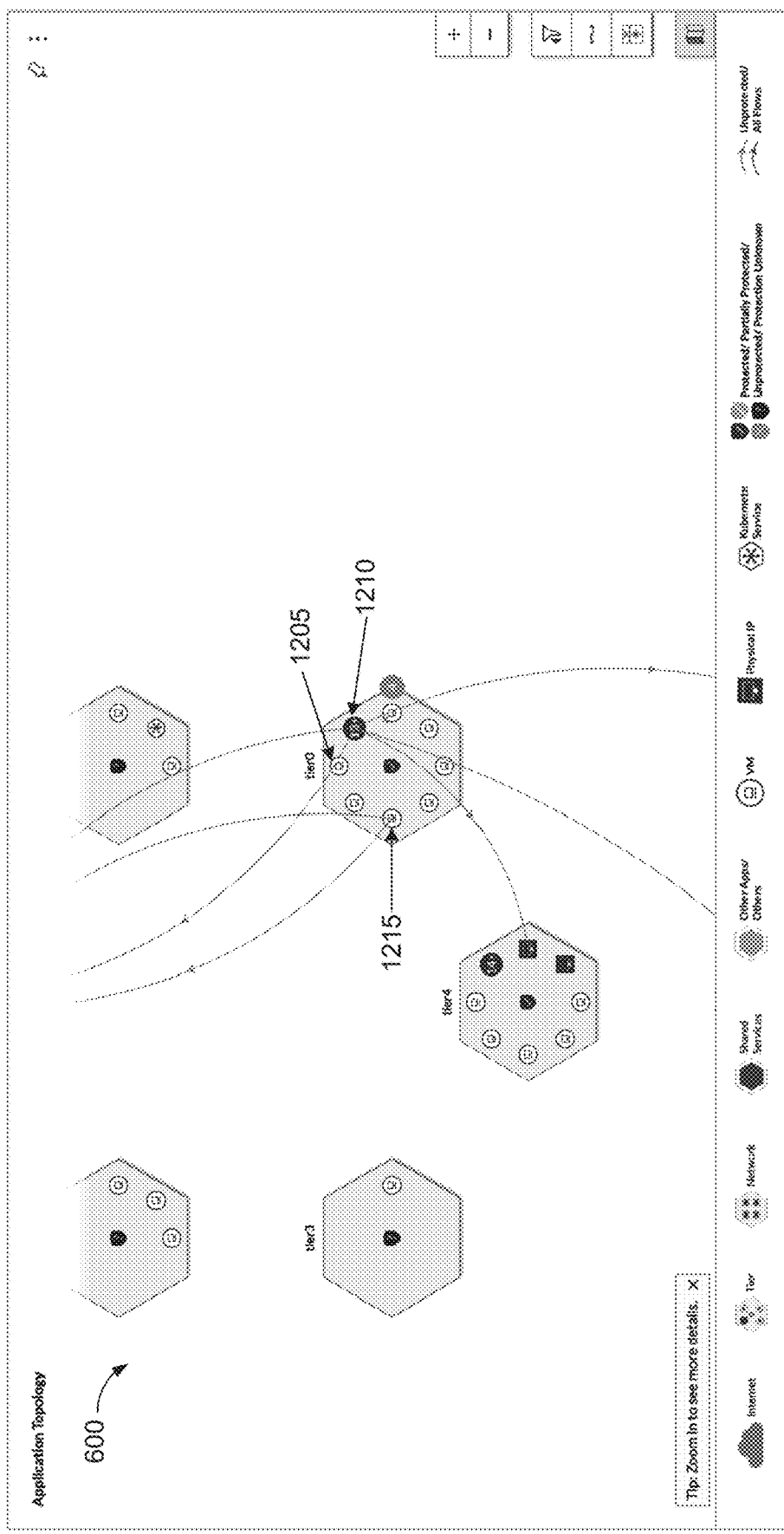
FIG. 12A is a flow diagram of a zoomed in (or drilled down) portion of application topology visualization, in accordance with an embodiment.

FIG. 12A is a flow diagram of a zoomed in (or drilled down) portion of application topology visualization 600 in accordance with an embodiment. In one embodiment, the drilling down occurs by zooming in (or otherwise focusing on) one or more tiers and the member level connections. For example, in FIG. 12A, the application topology visualization 600 has been drilled down with respect to tier0 and, in part, tier4. By drilling down (or zooming in), the members 1205 of the tier are more explicitly shown. Similarly, in one embodiment, the connections (or flows) are also clearly tied to a specific member level 1215. In one embodiment, when more members 1205 are shown upfront, the count 1210 of the group decreases to represent the remaining elements.

Figure 12B:
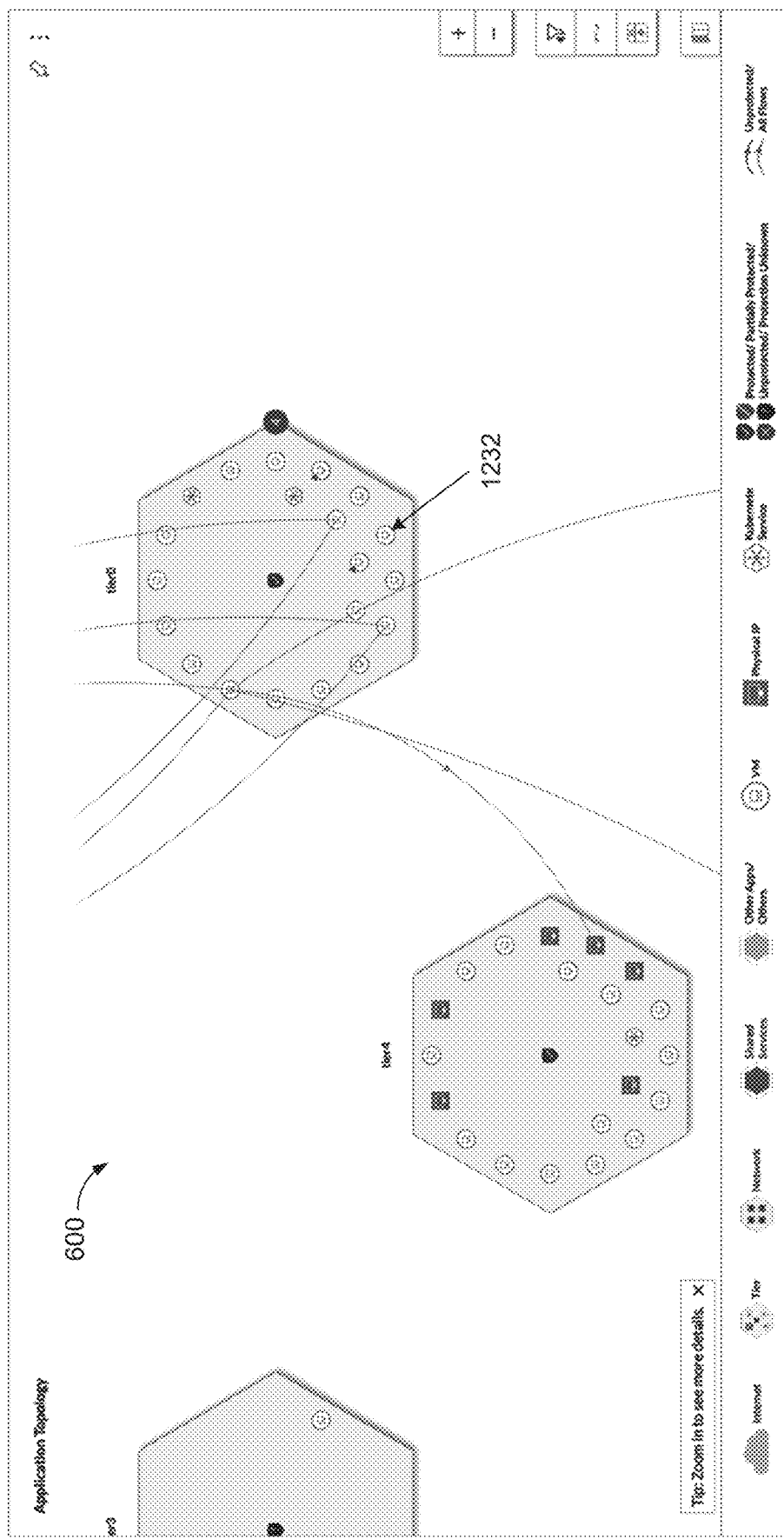
FIG. 12B is a flow diagram of a zoomed in (or drilled down) portion of application topology visualization to an even closer level than that of FIG. 12A, in accordance with an embodiment.

FIG. 12B is a flow diagram of a zoomed in (or drilled down) portion of application topology visualization 600 to an even closer level than that of FIG. 12A, in accordance with an embodiment. In one embodiment, similar to the description above, the drilling down occurs by zooming in (or otherwise focusing on) one or more tiers and the member level connections. For example, in FIG. 12A, the application topology visualization 600 has been drilled down with respect to tier0 and, in part, tier4.

However, in FIG. 12B, the application topology visualization 600 has been drilled down (or zoomed in) until all members 1232 of the tier0 are shown upfront and no additional grouping exists. Similarly, in one embodiment, the connections (or flows) are all now clearly tied to a specific member.

Figure 12C:
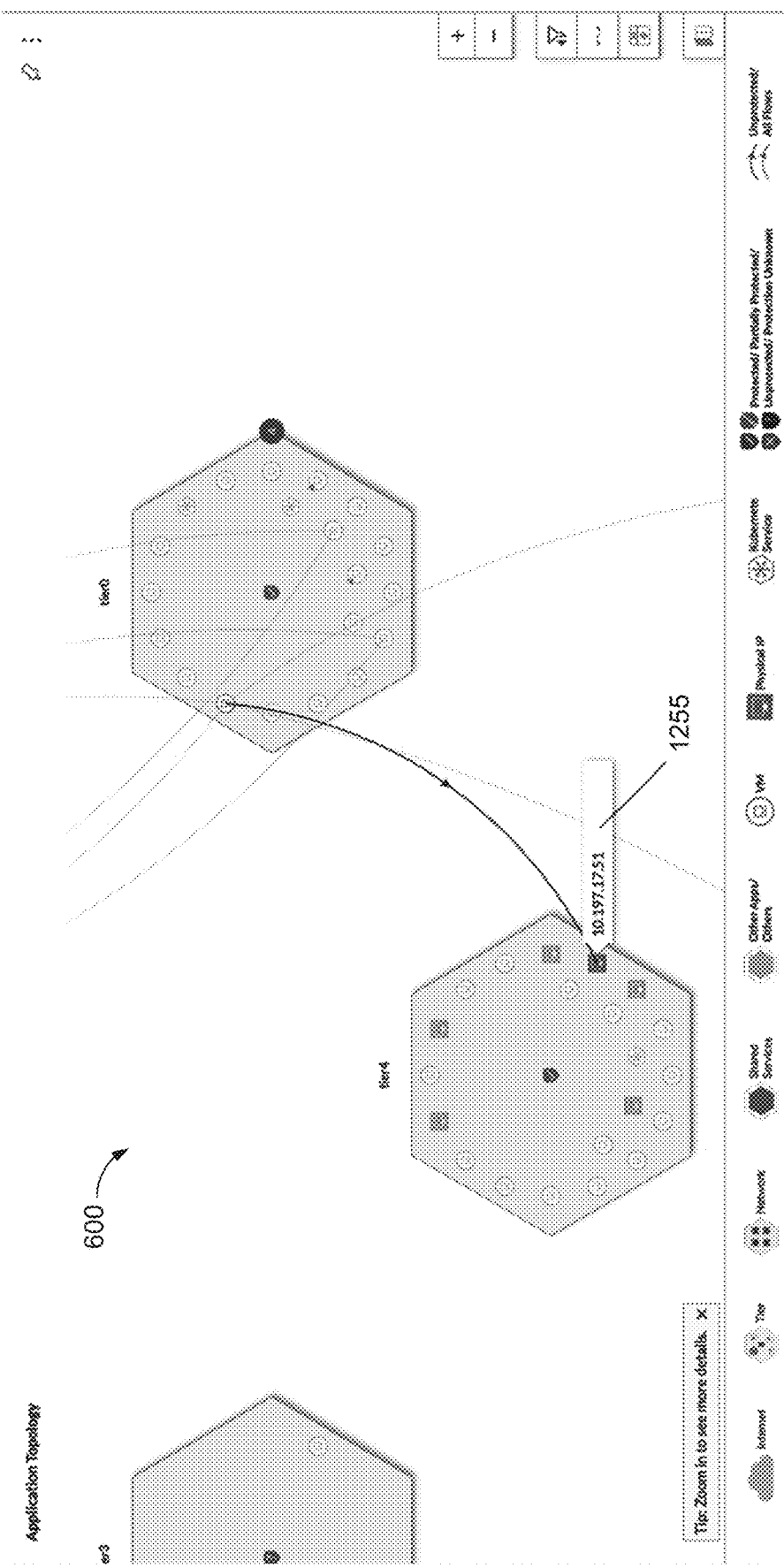
FIG. 12C is a flow diagram of a zoomed in (or drilled down) portion of application topology visualization to a level similar to that of FIG. 12B, in accordance with an embodiment.

FIG. 12C is a flow diagram of a zoomed in (or drilled down) portion of application topology visualization 600 to a level similar to that of FIG. 12B, in accordance with an embodiment. In one embodiment, by hovering (or otherwise identifying) over a member within a specific tier (e.g., tier4), the flows of that member are highlighted. In one embodiment, the hovering also causes the physical IP 1255 of the member to be shown in addition to the other VMs/Ips with which this IP 1255 is communicating.

Figure 13:
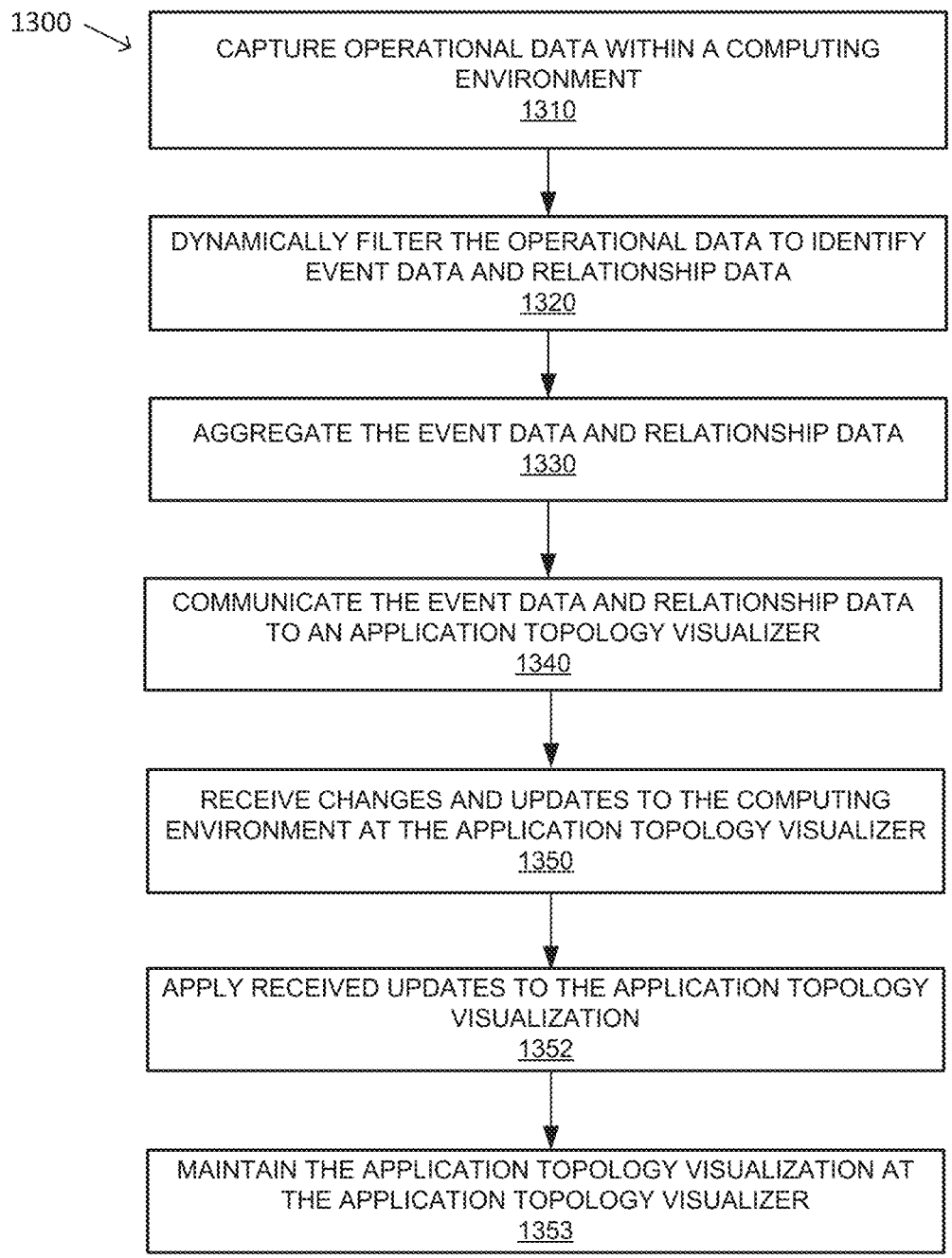
FIG. 13 depicts a flow diagram for data collection for generating an application topology visualization of a computing environment, in accordance with an embodiment.
Figure 14:
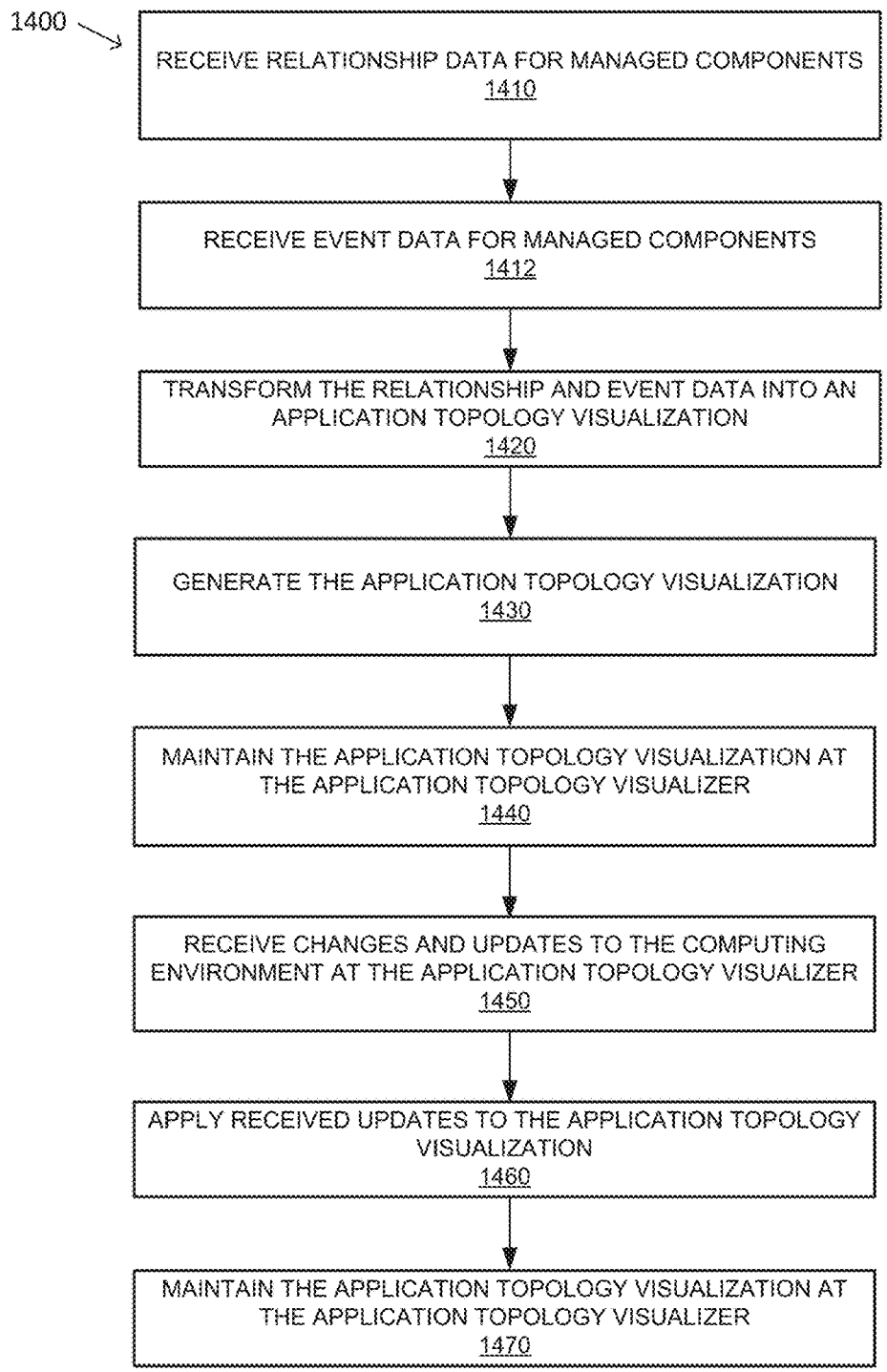
FIG. 14 depicts a flow diagram for generating an application topology visualization in a computing environment, in accordance with an embodiment.

With reference to FIGS. 13 and 14, various flow diagrams illustrating example procedures used by various embodiments are shown. The flow diagrams of FIGS. 13 and 14 include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 100 and/or host computer system 200). The computer-readable and computer-executable instructions, which reside on tangible computer readable storage media, are used to control or operate in conjunction with, for example, one or some combination of processors of the computer environments and/or virtualized environment.

It is appreciated that the processor(s) may be physical or virtual or some combination (it should also be appreciated that a virtual processor is implemented on physical hardware). Although specific procedures are disclosed in the flow diagrams, such procedures are examples. That is, embodiments are well suited to performing various other procedures or variations of the procedures recited in the flow diagrams. Likewise, in some embodiments, the procedures in the flow diagrams of FIGS. 13 and 14 may be performed in an order different than presented and/or not all of the procedures described in one or more of these flow diagrams may be performed. It is further appreciated that procedures described in the flow diagrams of FIGS. 13 and 14 may be implemented in hardware, or a combination of hardware with firmware and/or software provided by computer system 100 and/or host computer system 200.

FIG. 13 depicts a flow diagram 1300 for data collection in a computing environment, according to various embodiments. At 1310 of flow diagram 1300, operational data is captured within a computing environment. The computing environment includes a plurality of managed components, where the managed components are interrelated. In one embodiment, the computing environment is a datacenter and the plurality of managed components includes hardware components and virtual components of the datacenter. In one embodiment, the capturing is performed by a collector virtual appliance residing within the computing environment. In one embodiment, the virtual collector appliance is communicably coupled with the plurality of managed components via a management interface component of the plurality of managed components.

At 1320, the operational data is dynamically filtered within the computing environment to identify event data and managed component relationship data. In one embodiment, the managed component relationship data includes parent/child information for the plurality of managed components. In one embodiment, the collecting is performed by the collector virtual appliance. In one embodiment, as shown at 1330, the event data and managed component relationship data is aggregated at the computing environment.

At 1340, the event data and managed component relationship data is communicated to application topology visualizer 302 which uses the data to build application topology visualization 600. In one embodiment, as shown at 1350, the application topology visualizer 302 receives changes and updates to the computing environment. In one embodiment, as shown at 1352, the application topology visualizer 302 applies the updated information about the computing environment to the application topology visualization 600 to generate an updated application topology visualization 600. At 1354, the application topology visualization 600 is maintained at the application topology visualizer 302.

FIG. 14 depicts a flow diagram 1400 for generating an application topology visualization 600 of a computing environment, according to various embodiments. At 1410 of flow diagram 1400, managed component relationship data for a plurality of managed components of a computing environment is received. The managed component relationship data includes parent/child information for a managed component of the plurality of managed components. In one embodiment, the computing environment is a datacenter and the plurality of managed components includes hardware components and virtual components of the datacenter.

In one embodiment, the managed component relationship data is received from a collector virtual appliance residing within the computing environment. In one embodiment, the collector virtual appliance maintains a manifest for filtering the managed component relationship data of the computing environment from operational data of the computing environment. In one embodiment, as shown at 1412, event data for the plurality of managed components of a computing environment is received.

At 1420, the managed component relationship data and the event data is transformed into an application topology visualization 600 of the computing environment. At 1430, the application topology visualization is generated. In one embodiment, the application topology visualization 600 is presented on a single page of a GUI. At 1440, the application topology visualization is maintained for the computing environment at application topology visualizer 302.

In one embodiment, as shown at 1450, the application topology visualizer 302 receives changes and updates to the computing environment. In one embodiment, as shown at 1460, the application topology visualizer 302 applies the updated information about the computing environment to the application topology visualization 600 to generate an updated application topology visualization 600. At 1470, the application topology visualization 600 is maintained at the application topology visualizer 302.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of application topology visualization, the method comprising:
   obtaining relationship data for a plurality of managed components in a computing environment, wherein the plurality of managed components have an application operating thereon;
   obtaining event data for the plurality of managed components in the computing environment;
   generating, with an application topology visualizer, an application topology visualization of the computing environment comprising the plurality of managed components, wherein the application topology visualization comprises said relationship data and said event data for said plurality of managed components, said application topology visualizer providing a view of the current state of said computing environment to provide a visualization of a scope and complexity of said managed components of said computing environment, and said application topology visualizer providing a present operation status, investigation and scoping solutions, and the ability to scroll back in time and observe how said computing environment has changed, and wherein said application topology visualizer generates a badge, said badge identifying a number of problems, said badge enabling a user to drill down into the next level of said application topology visualization of said computing environment, said application topology visualization including a number of hexagons which represent different tiers, said application topology visualization including a network group visualization; and
   displaying, at a graphical user interface, the application topology visualization of the computing environment as a single page.

2. The computer-implemented method of claim 1, wherein the application topology visualization comprises a topology of the plurality of managed components and parent/child relationships interconnecting the plurality of managed components.

3. The computer-implemented method of claim 1, wherein the computing environment is a datacenter and the plurality of managed components comprises hardware components and virtual components of the datacenter.

4. The computer-implemented method of claim 1, further comprising:
   storing, at a database, the application topology visualization of the computing environment.

5. The computer-implemented method of claim 1, further comprising:
   determining a change to one or more of the plurality of managed components of the computing environment.

6. The computer-implemented method of claim 5, further comprising:
   updating, with the application topology visualizer and based on the change to one or more of the plurality of managed components, the application topology visualization of the computing environment to an updated application topology visualization of the computing environment.

7. The computer-implemented method of claim 6, further comprising:
   storing, at a database, the application topology visualization of the computing environment; and
   storing, at the database, the updated application topology visualization of the computing environment.

8. The computer-implemented method of claim 7, further comprising:
   providing, at the application topology visualizer, a time manipulation capability for the application topology visualization, wherein the time manipulation capability uses a set of application topology visualizations of the computing environment stored at the database to provide a prior time specific version of the application topology visualization.

9. The computer-implemented method of claim 8, further comprising:
   receiving a selected time; and
   providing, at the graphical user interface, the application topology visualization of the computing environment for the selected time.

10. The computer-implemented method of claim 1, further comprising:
    determining the event data for at least one of the plurality of managed components of the computing environment comprises a problem; and
    displaying an alert identifier at a tier comprising the at least one of the plurality of managed components of the computing environment having the problem.

11. The computer-implemented method of claim 1, wherein the event data comprises at least one managed component identifier.

12. The computer-implemented method of claim 1, further comprising:
    utilizing a plurality of tiers to represent the computing environment having the application operating thereon, each of the plurality of tiers comprising one or more of a VM, an IP address, and a Kubernetes pod;
    providing a number of flows between the plurality of tiers to indicate a plurality of communication pathways; and
    responsive to receiving a selection of a first tier of said plurality of tiers, highlighting on the application topology visualization, any other tier of said plurality of tiers that is in communication with said first tier.

13. A non-transitory computer readable storage medium having computer readable program code stored thereon for causing a computer system to perform a method for application topology visualization, the method comprising:
   obtaining relationship data for a plurality of managed components in a computing environment, wherein the plurality of managed components have an application operating thereon;
   obtaining event data for the plurality of managed components in the computing environment;
   generating, with an application topology visualizer, an application topology visualization of the computing environment comprising the plurality of managed components, wherein the application topology visualization comprises said relationship data and said event data for said plurality of managed components, said application topology visualizer providing a view of the current state of said computing environment to provide a visualization of a scope and complexity of said managed components of said computing environment, and said application topology visualizer providing a present operation status, investigation and scoping solutions, and the ability to scroll back in time and observe how said computing environment has changed, and wherein said application topology visualizer generates a badge, said badge identifying a number of problems, said badge enabling a user to drill down into the next level of said application topology visualization of said computing environment, said application topology visualization including a number of hexagons which represent different tiers, said application topology visualization including a network group visualization; and
   displaying, at a graphical user interface, the application topology visualization of the computing environment as a single page.

14. The non-transitory computer readable storage medium of claim 13, further comprising:
   utilizing a plurality of tiers to represent the computing environment having the application operating thereon, each of the plurality of tiers comprising one or more of a VM, an IP address, and a Kubernetes pod;
   providing a number of flows between the plurality of tiers to indicate a plurality of communication pathways; and
   responsive to receiving a selection of a first tier of said plurality of tiers, highlighting on the application topology visualization, any other tier of said plurality of tiers that is in communication with said first tier.

15. The non-transitory computer readable storage medium of claim 13, wherein the application topology visualization comprises a topology of the plurality of managed components and parent/child relationships interconnecting the plurality of managed components.

16. The non-transitory computer readable storage medium of claim 13, further comprising:
   storing, at a database, the application topology visualization of the computing environment;
   updating, with the application topology visualizer and based on a change to one or more of the plurality of managed components, the application topology visualization of the computing environment to an updated application topology visualization of the computing environment; and
   storing, at the database, the updated application topology visualization of the computing environment.

17. The non-transitory computer readable storage medium of claim 16, further comprising:
   providing, at the application topology visualizer, a time manipulation capability for the application topology visualization, wherein the time manipulation capability uses a set of application topology visualizations of the computing environment stored at the database to provide a prior time specific version of the application topology visualization.

18. The non-transitory computer readable storage medium of claim 17, further comprising:
   receiving a selected time; and
   providing, at the graphical user interface, the application topology visualization of the computing environment for the selected time.

19. A system for application topology visualization, the system comprising:
   a data storage unit; and
   a processor communicatively coupled with the data storage unit, the processor configured to:
      obtain relationship data for a plurality of managed components in a computing environment, wherein the plurality of managed components have an application operating thereon;
      obtain event data for the plurality of managed components in the computing environment;
      generate, with an application topology visualizer, an application topology visualization of the computing environment comprising the plurality of managed components, wherein the application topology visualization comprises said relationship data and said event data for said plurality of managed components;
      display, at a graphical user interface, the application topology visualization of the computing environment as a single page;
      store, at a database, the application topology visualization of the computing environment;
      update, with the application topology visualizer and based on a change to one or more of the plurality of managed components, the application topology visualization of the computing environment to an updated application topology visualization of the computing environment, said application topology visualizer providing a view of the current state of said computing environment to provide a visualization of a scope and complexity of said managed components of said computing environment, and said application topology visualizer providing a present operation status, investigation and scoping solutions, and the ability to scroll back in time and observe how said computing environment has changed, and wherein said application topology visualizer generates a badge, said badge identifying a number of problems, said badge enabling a user to drill down into the next level of said application topology visualization of said computing environment, said application topology visualization including a number of hexagons which represent different tiers, said application topology visualization including a network group visualization; and
      store, at the database, the updated application topology visualization of the computing environment.

20. The system for application topology visualization of claim 19, further comprising:
   a plurality of tiers to represent the computing environment having the application operating thereon, each of the plurality of tiers comprising one or more of a VM, an IP address, and a Kubernetes pod;

a number of flows between the plurality of tiers to indicate a plurality of communication pathways; and responsive to a selection of a first tier of said plurality of tiers, highlight on the application topology visualization, any other tier of said plurality of tiers that is in communication with said first tier.

\* \* \* \* \*